US010009509B2

(12) United States Patent
Katsuyama

(10) Patent No.: US 10,009,509 B2
(45) Date of Patent: Jun. 26, 2018

(54) IMAGE PROCESSING DEVICE, IMAGE PROCESSING METHOD, AND PRINTING SYSTEM

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 46 days.

(21) Appl. No.: 14/930,871

(22) Filed: Nov. 3, 2015

(65) Prior Publication Data

US 2016/0127608 A1    May 5, 2016

(30) Foreign Application Priority Data

Nov. 5, 2014    (JP) .................................. 2014-224908

(51) Int. Cl.
    *H04N 1/405*     (2006.01)
    *B41J 2/205*     (2006.01)
    *B41J 2/21*      (2006.01)
    *H04N 1/40*      (2006.01)

(52) U.S. Cl.
    CPC .......... *H04N 1/4051* (2013.01); *B41J 2/2054* (2013.01); *B41J 2/2132* (2013.01); *H04N 1/40087* (2013.01)

(58) Field of Classification Search
    None
    See application file for complete search history.

(56) References Cited

U.S. PATENT DOCUMENTS

| 2008/0117464 A1* | 5/2008 | Crounse | H04N 1/4051 358/3.03 |
| 2011/0122451 A1* | 5/2011 | Tsutsumi | H04N 1/405 358/3.06 |
| 2014/0362415 A1* | 12/2014 | Kakutani | H04N 1/4053 358/3.06 |

OTHER PUBLICATIONS

S. Bhatt, et al., "Direct Binary Search with Adaptive Search and Swap", pp. 1-9, Aug. 2005.

* cited by examiner

*Primary Examiner* — Lennin Rodriguezgonzale
(74) *Attorney, Agent, or Firm* — Studebaker & Brackett PC

(57) ABSTRACT

An image processing device includes a first image generation unit which generates a first image obtained by applying a first low-pass filter to an input image, a second image generation unit which generates a second image obtained by applying a second low-pass filter to a halftone image, a third image generation unit which generates a third image representing a difference between the first image and the second image, a focused dot setting unit which sets a focused dot, a dot placement pixel determination unit which compares pixel values in the third image and determining a dot placement pixel for improving the uniformity of the gradation distribution in the third image, and a dot displacing unit which displaces the focused dot to the dot placement pixel and updates the halftone image.

16 Claims, 10 Drawing Sheets

RELATED ART

IMAGE PROCESSING DEVICE, IMAGE PROCESSING METHOD, AND PRINTING SYSTEM

CROSS-REFERENCE TO RELATED APPLICATIONS

The patent application claims priority under 35 U.S.C. § 119 to Japanese Patent Application No. 2014-224908 filed on Nov. 5, 2014. Each of the above application is hereby expressly incorporated by reference, in its entirety, into the present application.

BACKGROUND OF THE INVENTION

Field of the Invention

The present invention relates to an image processing device, an image processing method, and a printing system. In particular, the present invention relates to an image processing technology to generate a halftone image for printing from a continuous-tone image.

Description of the Related Art

In a printing system in which image formation is performed by a printing device such as an ink jet printing device or an offset printing device, data of a halftone image adapted for the image outputting method in the printing device is generated by applying halftone processing to data of a continuous-tone image expressed in multiple tones. Data of a halftone image is used as dot image data for printing, showing a dot pattern in which a dot arrangement of halftone dots and the size of each dot, to be reproduced by a printing device, are defined. The printing device performs image formation based on the data of a halftone image.

As a method of halftone processing for obtaining a high-quality halftone image, the Direct Binary Search (DBS) method has been known (Sagar Bhatt, John Harlim, Joel Lepak, Robert Ronkese, John Sabino, Chai Wah Wu, "Direct Binary Search with Adaptive Search and Swap", pp. 1-9, 2005).

SUMMARY OF THE INVENTION

In the conventional DBS method, with respect to each of the focused dots (dots of interest), it is necessary to repeat the processing to temporarily displace each focused dot to each candidate pixel which is a nearby blank pixel, apply a low-pass filter to a halftone image after the displacement to correct a low-pass halftone image, and calculate a difference between a low-pass input image obtained by applying a low-pass filter to an input image, and a low-pass halftone image, to thereby search for a dot displacement position where the difference is minimized.

A blank pixel means a pixel having no dot, that is, a pixel in which no dot is placed. The expression of "applying" a low-pass filter means, in a spatial area, convoluting a spatial filter. A convoluting operation is called convolution. In the present description, an image generated by applying a low-pass filter to a halftone image is called a low-pass halftone image. Further, an image generated by applying a low-pass filter to an input image is called a low-pass input image.

As described above, in the conventional DBS method, as it is necessary to sequentially change the focused dot, and for each focused dot, repeatedly perform correction processing of a low-pass halftone image through temporal placement of a dot to each nearby candidate pixel and calculation of a difference between a low-pass input image and a low-pass halftone image, a significant amount of arithmetic operation amount is required.

The present invention has been made in consideration of such a situation. An object of the present invention is to provide an image processing device, an image processing method, and a printing system, capable of obtaining a good halftone image by optimizing the dot arrangement with a smaller amount of arithmetic operation, compared with the case of the conventional DBS method.

In order to achieve the object described above, the following aspects of the invention are provided.

An image processing device, according to a first aspect, includes a first image generation unit which generates a first image obtained by applying a first low-pass filter to an input image; a second image generation unit which generates a second image obtained by applying a second low-pass filter to a halftone image corresponding to the input image; a third image generation unit which generates a third image representing a difference between the first image and the second image; a focused dot setting unit which sets a focused dot in the halftone image; a dot placement pixel determination unit which determines a dot placement pixel by comparing pixel values in the third image, the dot placement pixel being a location where a dot is placed when dot displacement processing is performed to improve the uniformity of the gradation distribution in the third image; and a dot displacing unit which performs the dot displacement processing to displace the focused dot in the halftone image to the position of the dot placement pixel, and updates the dot arrangement of the halftone image.

According to the first aspect, the third image, representing a difference between the first image and the second image, is generated, and based on the comparison between pixel values in the third image, the position of the dot placement pixel is specified, and processing to displace the focused dot in the halftone image to the dot placement pixel is performed. Each pixel value of the third image can be used as an evaluation index (that is, evaluation value) for determining the dot placement pixel. According to the first aspect, as the position of the dot placement pixel is specified based on the comparison between pixel values in the third image so as to improve the uniformity of the gradation distribution in the third image, it is possible to generate an optimum halftone image with a smaller amount of arithmetic operation compared with the case of the conventional DBS method.

As a second aspect, the image processing device of the first aspect may be configured such that the dot arrangement of the halftone image corresponding to the input image is optimized by changing the focused dot, and with respect to another focused dot, repeating the processing of determining the dot placement pixel by the dot placement pixel determination unit and the dot displacement processing by the dot displacing unit.

By repeating the dot displacement processing, optimization of the dot arrangement is advanced, whereby a good halftone image can be obtained.

As a third aspect, the image processing device of the first aspect or the second aspect may be configured such that the third image generation unit generates the third image representing a difference between the first image and the second image by performing subtraction on pixel values of corresponding pixels between the images of the first image and the second image.

As a fourth aspect, the image processing device of the first aspect or the second aspect may be configured such that the third image generation unit generates the third image representing a ratio between the first image and the second image by performing division on pixel values of corresponding pixels between the images of the first image and the second image.

As a fifth aspect, the image processing device of any one aspect of the first aspect to the fourth aspect may be configured such that a third image correction unit which performs correction processing on the third image and updates the third image, along with the dot displacement processing by the dot displacing unit, is further included, and that the third image correction unit updates the third image by removing, from the third image, a contribution component of the second low-pass filter corresponding to the focused dot, and adding, to the third image, a contribution component of the second low-pass filter corresponding to the focused dot placed on the dot placement pixel by the dot displacement processing.

As a sixth aspect, the image processing device of any one aspect of the first aspect to the fifth aspect may be configured such that a first density value conversion unit which converts a gradation value of each pixel in the input image into a density value is included, that a second density value conversion unit which converts a gradation value of a dot of each pixel in the halftone image, corresponding to the input image, into a density value, is included, that the first image generation unit generates the first image by applying the first low-pass filter to an image obtained by converting a gradation value in the input image into a density value by the first density value conversion unit, and that the second image generation unit generates the second image by applying the second low-pass filter to an image obtained by converting a gradation value in the halftone image into a density value by the second density value conversion unit.

As a seventh aspect, the image processing device of any one aspect of the first aspect to the sixth aspect may be configured such that an initial halftone image generation unit which generates an initial halftone image corresponding to the input image is included.

As an eighth aspect, the image processing device of the seventh aspect may be configured such that the initial halftone image generation unit generates a halftone image showing an arrangement pattern of dots of a number of dots defined based on the input image.

As a ninth aspect, the image processing device of any one aspect of the first aspect to the eighth aspect may be configured such that the halftone image includes a plurality of dot types in a mixed manner, and that the second low-pass filter corresponding to each of the dot types differs for each of the dot types.

As a tenth aspect, the image processing device of any one aspect of the first aspect to the ninth aspect may be configured such that the dot placement pixel determination unit determines, among blank pixels as candidates existing within a range of an image area predetermined from a pixel position of the focused dot, a pixel having a minimum value in the third image to be the dot placement pixel.

As an eleventh aspect, the image processing device of any one aspect of the first aspect to the ninth aspect may be configured such that the dot placement pixel determination unit determines, among blank pixels as candidates existing within a range of an image area predetermined from a pixel position of the focused dot, a pixel selected from pixels having a value smaller by a prescribed value than a pixel value corresponding to a pixel position of the focused dot in the third image or a further smaller value to be the dot placement pixel.

An image processing method, according to a twelfth aspect, includes a first image generation step of generating a first image obtained by applying a first low-pass filter to an input image; a second image generation step of generating a second image obtained by applying a second low-pass filter to a halftone image corresponding to the input image; a third image generation step of generating a third image representing a difference between the first image and the second image; a focused dot setting step of setting a focused dot in the halftone image; a dot placement pixel determination step of determining a dot placement pixel by comparing pixel values in the third image, the dot placement pixel being a location where a dot is placed when dot displacement processing is performed to improve uniformity of gradation distribution in the third image; and a dot displacement step of performing the dot displacement processing to displace the focused dot in the halftone image to the position of the dot placement pixel, and updating the dot arrangement of the halftone image.

In the image processing method according to the twelfth aspect, matters same as the specified matters in the image processing device specified in the second aspect to the eleventh aspect can be combined appropriately. In that case, processing units and function units as devices, in charge of processing and functions specified in the image processing device, can be understood as elements of the "steps" of the processing and the operation corresponding thereto.

A thirteenth aspect is a non-transitory computer-readable recording medium including instructions stored thereon, such that when the instructions are read and executed by a computer, the computer is configured to realize a first image generation function which generates a first image obtained by applying a first low-pass filter to an input image; a second image generation function which generates a second image obtained by applying a second low-pass filter to a halftone image corresponding to the input image; a third image generation function which generates a third image representing a difference between the first image and the second image; a focused dot setting function which sets a focused dot in the halftone image; a dot placement pixel determination function which determines a dot placement pixel by comparing pixel values in the third image, the dot placement pixel being a location where a dot is placed when dot displacement processing is performed to improve uniformity of gradation distribution in the third image; and a dot displacing function which performs the dot displacement processing to displace the focused dot in the halftone image to the position of the dot placement pixel, and updates the dot arrangement of the halftone image.

According to the thirteenth aspect, matters same as the specified matters in the image processing device specified in the second aspect to the eleventh aspect can be combined appropriately. In that case, processing units and function units as devices in charge of processing and functions specified in the image processing device can be understood as elements of the "functions" of the program executing the processing and the operation corresponding thereto.

A printing system, according to a fourteenth aspect, includes a first image generation unit which generates a first image obtained by applying a first low-pass filter to an input image; a second image generation unit which generates a second image obtained by applying a second low-pass filter to a halftone image corresponding to the input image; a third image generation unit which generates a third image representing a difference between the first image and the second image; a focused dot setting unit which sets a focused dot in the halftone image; a dot placement pixel determination unit which determines a dot placement pixel by comparing pixel values in the third image, the dot placement pixel being a location where a dot is placed when dot displacement processing is performed to improve uniformity of gradation distribution in the third image; a dot displacing unit which performs the dot displacement processing to displace the focused dot in the halftone image to the position of the dot placement pixel, and updates a dot arrangement of the halftone image; and a printing device which performs printing on a print medium based on a halftone image generated by repeating the dot displacement processing by the dot displacing unit.

In the printing system according to the fourteenth aspect, matters same as the specified matters in the image processing device specified in the second aspect to the eleventh aspect can be combined appropriately.

According to the present invention, it is possible to obtain a good halftone image by optimizing the dot arrangement with a smaller amount of arithmetic operation, compared with the case of the conventional DBS method.

DETAILED DESCRIPTION OF THE EMBODIMENTS

Hereinafter, embodiments of the present invention are described in detail according to the accompanying drawings.
<Exemplary Configuration of Printing System>

Figure 1:
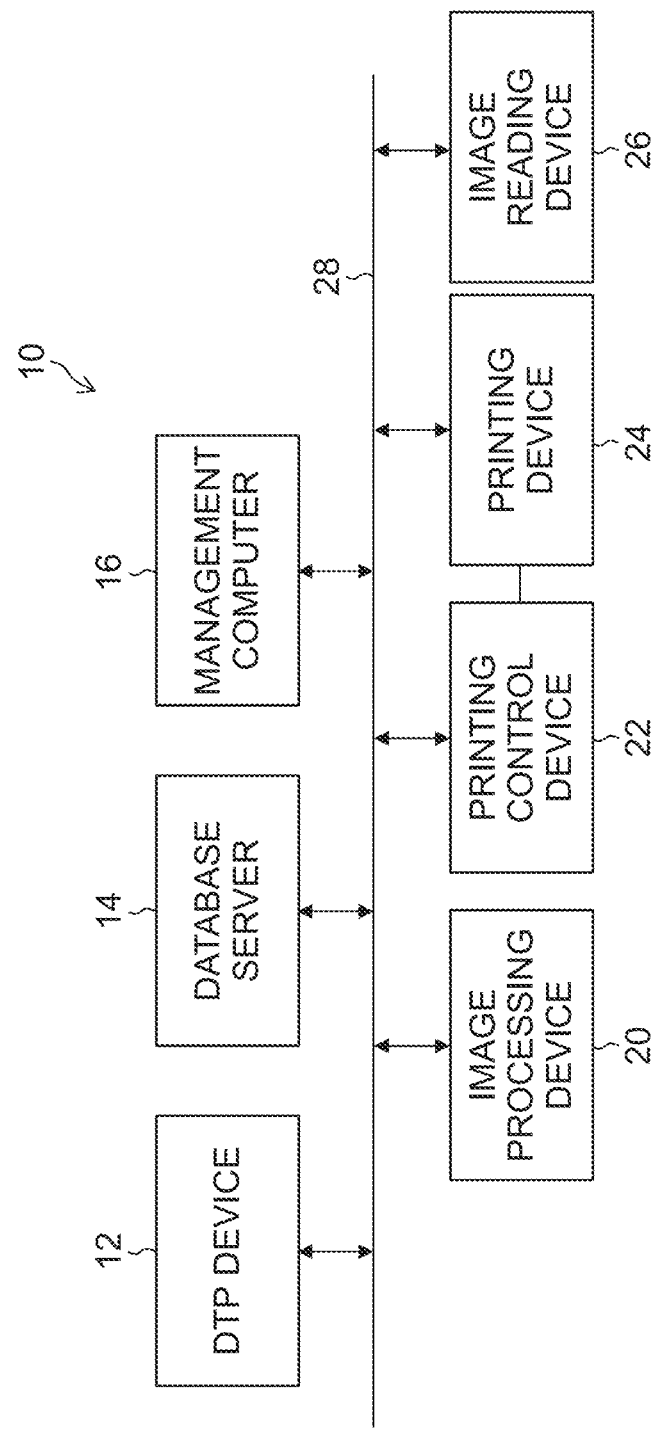
FIG. 1 is a block diagram illustrating an exemplary configuration of a printing system according to an embodiment of the present invention.

FIG. 1 is a block diagram illustrating an exemplary configuration of a printing system according to an embodiment of the present invention. A printing system 10 includes a DTP (Desk Top Publishing) device 12, a database server 14, a management computer 16, an image processing device 20, a printing control device 22, a printing device 24, and an image reading device 26. The image processing device 20 is connected with the DTP device 12, the database server 14, the management computer 16, the printing control device 22, and the image reading device 26, via an electric communication line 28.

The electric communication line 28 may be a local area network (LAN), a wide area network (WAN), or a combination thereof. The electric communication line 28 is not limited to a wired communication line, and part or whole thereof may be a wireless communication line. Further, in the present description, an expression "connection" between devices capable of delivering signals includes not only a wired connection but also a wireless connection.

The DTP device 12 is a device which generates data of a document image showing an image content to be printed. The DTP device 12 is realized by a combination of hardware and software of a computer. The term software is a synonym for a program. The DTP device 12 is used to edit various types of image components such as characters, graphics, patterns, illustrations, and picture images to be printed, and lay out them on a printing surface.

Through the editing work and the like by the DTP device 12, document image data as printing source image data is generated. The DTP device 12 generates an electronic document by a page description language (PDL). The document image data generated by the DTP device 12 is transferred to the database server 14 or the image processing device 20. It should be noted that as a device which generates document image data, an aspect of generating it by another computer, an image generation/editing device, or the like, not shown, is also possible, without limited to an aspect of generating it by the DTP device 12. The document image data is able to be input to the database server 14, the image processing device 20, the printing control device 22, and the like, through the electric communication line 28 or with use of a removable medium (external storage medium) such as a memory card.

The database server 14 is a device which performs various types of data management such as a job ticket of an electronic document, color sample data, a target profile, and a device profile suitable for a combination of the printing device 24 and a sheet. It should be noted that a job ticket may be in JDF (Job Definition Format) file format.

The management computer 16 performs various types of management in the printing system 10, including image management, management of a print job, and management of operating states of one or a plurality of printing devices 24, for example.

The image processing device 20 functions as a device which performs rasterize processing on document image data for printing (for example, data described in a page description language) generated by the DTP device 12 or the like. The rasterize processing is called RIP (Raster Image Processor) processing. The image processing device 20 may be realized as one function of an RIP device.

The image processing device 20 has a color conversion processing function and a halftone processing function for performing conversion from document image data for printing, which is a continuous-tone image, into data of dot patterns of each color suitable for being output by the printing device 24. The image processing device 20 may be realized by a combination of hardware and software of a computer.

The specific contents of the processing functions in the image processing device 20 are described below. By providing the printing control device 22 with data of a halftone image generated by the image processing device 20, printing of a target image is performed by the printing device 24.

The printing control device 22 controls printing operation by the printing device 24, based on the data of a print image generated by the image processing device 20. The printing device 24 is an image formation device which performs printing according to control by the printing control device 22. The printing device 24 performs printing on a printing medium (not shown) based on the halftone image generated by the image processing device 20.

In this example, as the printing device 24, a mode using an ink jet printing machine which is an example of a plateless digital printing machine is described. The term "printing device" is understood as a synonym of terms such as a printing machine, a printer, an image recording device, an image formation device, and an image output device.

As an example of the printing device 24, the printing system 10 of the present embodiment uses an ink jet printing machine capable of forming a color image with use of inks of four colors including cyan (C), magenta (M), yellow (Y), and black (K). However, the number of colors of inks and combinations thereof are not limited to this example. For example, an aspect of adding inks of light colors such as light cyan (LC) and light magenta (LM), besides the four colors of CMYK, and an aspect of using inks of spot colors such as red and green, are also possible.

While FIG. 1 shows an aspect in which the printing control device 22 and the printing device 24 are shown in different blocks and signals are delivered between them by a connection of wired or wireless communications, the printing device is not limited to have such a configuration. It is also possible to configure a printing device in which the printing control device 22 and the printing device 24 are integrated.

The image reading device 26 is a device which reads the image of a printed matter (print) printed by the printing device 24, and generates electronic image data showing the readout image. The image reading device 26 includes an image capturing element (photoelectric conversion element) which captures the image of a printed matter and converts the image information into an electric signal, and a signal processing circuit which processes a signal obtained from the image capturing element and generates digital image data.

As the image reading device 26, a scanner separate from the printing device 24 (for example, a so-called offline scanner which can be used offline, such as a scanner of a flat-bed type) and a camera may be used. The image reading device 26 may also be one incorporated in the printing device 24. For example, the image reading device 26 may have a configuration in which a line sensor (image pickup unit) for reading an image is provided on the sheet conveying route of the printing device 24 and a print image is read by the line sensor, while conveying the printed matter after the image has been formed. The line sensor for reading an image, provided on the sheet conveying route, in the printing device 24 may be called an "inline scanner" or an "inline sensor".

The readout image data of the print image generated by the image reading device 26 is input to the image processing device 20. The image processing device 20 may have a function of analyzing the readout image data obtained from the image reading device 26.

<Regarding Variations of System Configuration>

The functions of the DTP device 12, the database server 14, the management computer 16, the image processing device 20, and the printing control device 22 may be realized by one computer or a plurality of computers. Further, allocation of the roles and functions of the respective computers may take various forms. For example, the DTP device 12 and the image processing device 20 may be integrated to thereby realize those functions by one computer, or the functions of the image processing device 20 may be installed in the management computer 16. The functions of the image processing device 20 and the functions of the printing control device 22 may be realized by one computer. The functions of the image processing device 20 may be shared and realized by a plurality of computers.

There is no limitation in the number of the DTP device 12, the database server 14, the management computer 16, the image processing device 20, the printing control device 22, the printing device 24, the image reading device 26, a platemaking device, and the like, included in this system.

Further, while the example shows a form of the network system in which the DTP device 12, the database server 14, the management computer 16, the image processing device 20, the printing control device 22, and the like are connected with the electric communication line 28, the respective elements are not necessarily connected with the communication network when the invention is carried out.

<Hardware Configuration of Image Processing Device 20>

Figure 2:
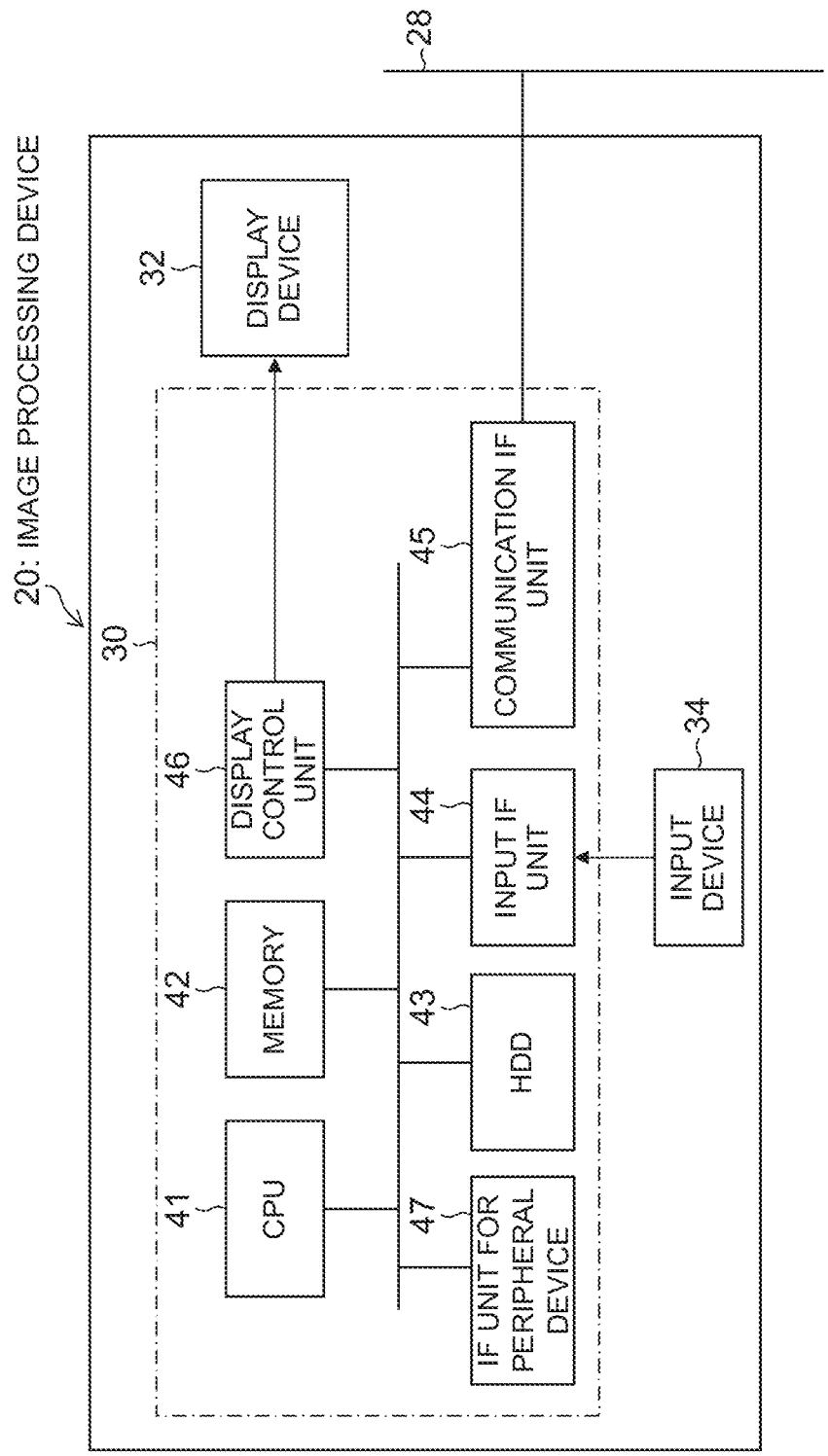
FIG. 2 is a block diagram illustrating an exemplary hardware configuration of an image processing device.

FIG. 2 is a block diagram illustrating an exemplary hardware configuration of the image processing device 20. The image processing device 20 of the example is realized by using a computer. The computer is a computer in any form such as a desktop type, a notebook type, a tablet type, or the like. The computer may be a personal computer or a server computer.

The image processing device 20 includes a computer body 30, a display device 32, and an input device 34. The computer body 30 includes a central processing unit (CPU) 41, a memory 42, a hard disk drive (HDD) 43, an input interface unit 44, a communication interface unit 45 for network connections, a display control unit 46, and an interface unit 47 for peripheral devices. The image reading device 26 described in FIG. 1 may be connected with the image processing device 20 via the interface unit 47 for peripheral devices shown in FIG. 2. It should be noted that in FIG. 2, a simple expression "IF unit" is used as a substitute expression for a description "interface unit", to simplify the expression. "IF" is an abbreviated expression of "interface".

As the display device 32, for example, a liquid crystal display, an organic electro-luminescence (EL) display, or the like may be used. The display device 32 is connected with the display control unit 46. As the input device 34, any of various types of devices such as a keyboard, a mouse, a touch panel, a truck ball, and the like, or appropriate combinations thereof, may be adopted. It should be noted that a form in which the display device 32 and the input device 34 are integrally configured, like a configuration in which a touch panel is arranged on the display device 32, is also possible.

The input device 34 is connected with the input interface unit 44. The display device 32 and the input device 34 function as user interfaces (UI). An operator (user) is able to input various types of information using the input device 34 while monitoring the contents shown on the screen of the display device 32, and operate the image processing device 20, the printing device 24, and the like. The user is also able to check various types of information such as input contents, the system condition, and the like, through the display on the display device 32.

The hard disk drive 43 is a storage device which stores and holds programs, data, and the like. In the hard disk drive 43, various programs, data, and the like necessary for image processing are stored. A program stored in the hard disk drive 43 is loaded to the memory 42 and the program is executed by the CPU 41, whereby the computer functions as various types of devices defined by the program. Instead of the hard disk drive 43, or in combination with it, it is possible to use a storage device having a form of various types including a solid state drive (SSD), a RAM (Random Access Memory), an optical disk or a memory card, or an appropriate combination thereof.

It should be noted that a configuration which is the same as the hardware configuration of the computer including the computer body 30, the display device 32, and the input device 34, shown in FIG. 2, may be adopted as the hardware configuration of the DTP device 12, the database server 14, the management computer 16, the printing control device 22, or the like, described in FIG. 1.

<Functional Block Diagram of Image Processing Device>

Figure 3:
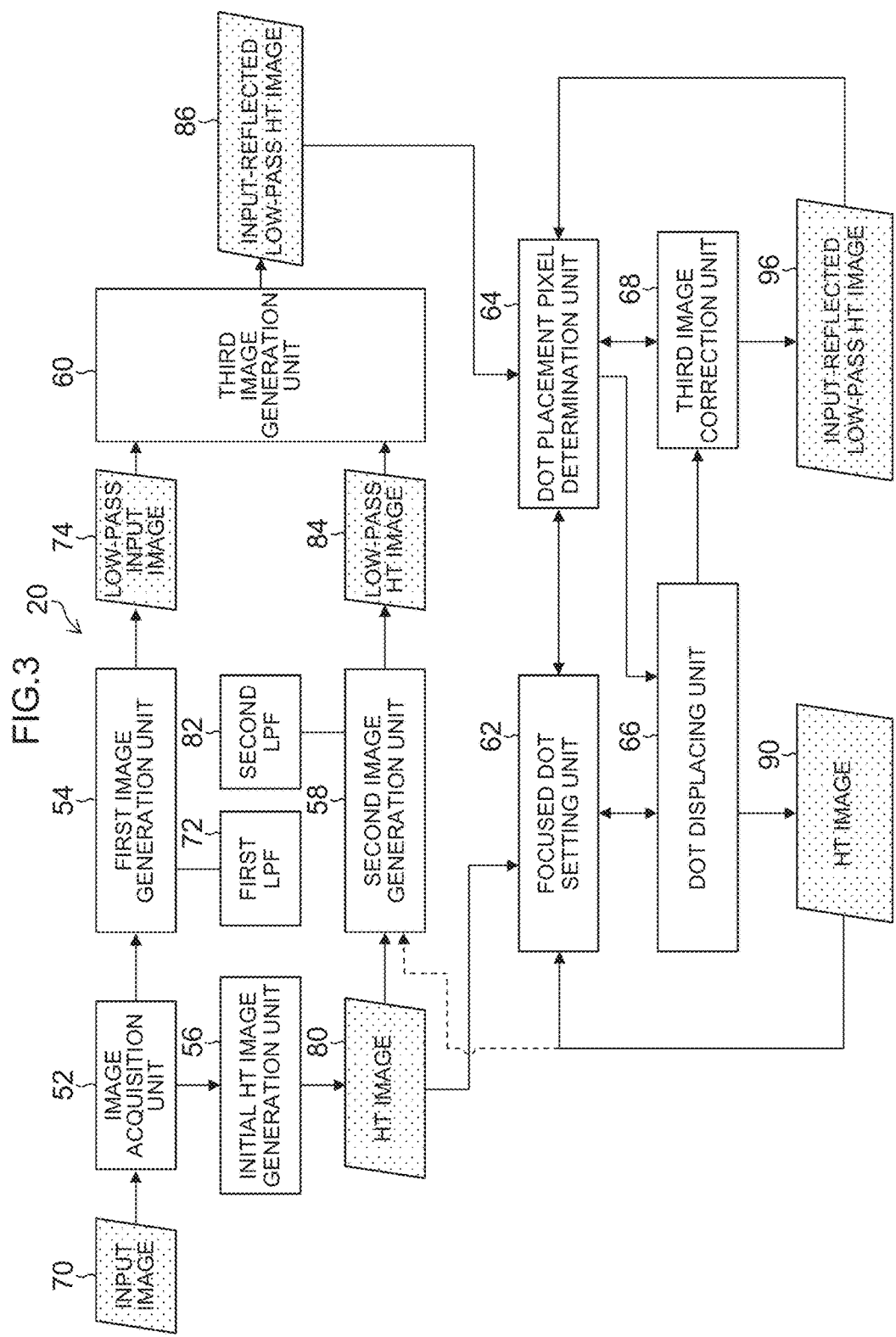
FIG. 3 is a functional block diagram of an image processing device according to a first embodiment.

FIG. 3 is a functional block diagram of the image processing device 20 according to a first embodiment. The image processing device 20 includes an image acquisition unit 52, a first image generation unit 54, an initial halftone image generation unit 56, a second image generation unit 58, a third image generation unit 60, a focused dot setting unit 62, a dot placement pixel determination unit 64, a dot displacing unit 66, and a third image correction unit 68. In FIG. 3 and other drawings, a simple expression "HT" is used as a substitute expression for a description "halftone", to simplify the description. HT is an abbreviated expression of "halftone".

The image acquisition unit 52 is an interface unit which takes in an input image 70. The image acquisition unit 52 may be configured of a data input terminal which takes in the input image 70 from another signal processing unit provided outside or inside the device. As the image acquisition unit 52, it is possible to adopt a wired or wireless communication interface unit, a media interface unit which performs reading and writing on a portable-type external storage medium such as a memory card, or an appropriate combination of these aspects.

The first image generation unit 54 convolutes a first low-pass filter 72 into the input image 70, to generate a low-pass input image 74. The low-pass input image 74 corresponds to a form of a "first image". This means that the first image generation unit 54 performs processing to generate the low-pass input image 74 as a first image obtained by applying the first low-pass filter 72 to the input image 70. In FIG. 2 and other drawings, a simple expression "LPF" is used as a substitute expression for a description "low-pass filter", to simplify the description. LPF is an abbreviated expression of "low-pass filter".

As the first low-pass filter 72, a visual transfer function (VTF) suitable for human visual characteristics may be used. As the first low-pass filter 72, a Gaussian function may also be used. It should be noted that as a visual transfer function, while a graph function in which a horizontal axis shows frequency and the vertical axis shows response has been known, this frequency characteristics (that is, a filter in a frequency space) can be replaced with a spatial filter in an actual space. An operation of applying f(fx, fy) of a visual transfer function in the frequency space is processing which is mathematically equivalent to convolution of a spatial filter F(x, y) in an actual space. This is also similar in the case of Gaussian function. An arithmetic operation of "applying" in either one of a frequency space or an actual space is equivalent to a convoluting operation in the other space. The expression "apply" is used covering both meanings.

The initial halftone image generation unit 56 performs processing to generate an initial halftone image 80 corresponding to the input image 70. A method of generating the initial halftone image 80 by the initial halftone image generation unit 56 is not limited, particularly. A well-known dither method, error diffusion method, or the like is applicable.

Instead of a dither method, an error diffusion method, or the like, the initial halftone image generation unit 56 may generate the initial halftone image 80 by the processing as described below. That is, the initial halftone image generation unit 56 may have a configuration of generating the halftone image 80 showing a dot arrangement pattern of the number of dots determined based on the input image 70. First, with respect to each input gradation value within a value range which is a range of values that a pixel value of the input image 70 may take, the number of dots per unit area in which each input gradation value becomes a corresponding density is calculated, and a dot number density representing the number of dots per pixel is calculated with respect to each input gradation value. A unit of dot number density is [pieces/pix]. The expression "pix" means a pixel.

Specifically, for example, on the assumption that the value range of pixel values is a range from 0 to 255 (8-bit gradation), with respect to each of the input gradation values from 0 to 255, the dot number density of an input gradation value 0 is 0, the dot number density of an input gradation value 255 is 1, and with respect to an input gradation value between them, a dot number density larger than 0 but smaller than 1 is given.

Then, the total number of dots is calculated by adding the dot number density corresponding to the input gradation value, which is a value of each pixel in the input image 70, regarding the entire pixels of the input image 70. The total number of dots calculated here shows the number of dots of a halftone image corresponding to the input image 70, which constitutes a constraint condition of the number of dots when the initial halftone image 80 is generated.

In this way, the pieces of dots which are the same as the total number of dots calculated from the input image 70 are dispersedly arranged at pixel positions in the image area in almost equal intervals or randomly, whereby the initial halftone image 80 is generated. The initial halftone image 80 may be a dot image in which dots of the defined number, calculated based on the input image 70, are arranged. The distribution form of the dots is arbitrary, and a dot image which favorably reproduces the image content of the input image 70 is not necessary required. By repeating the dot replacement processing, described below, starting from the dot arrangement state in the initial halftone image 80, the dot arrangement is optimized to one suitable for reproducing the image content of the input image 70, and finally, a halftone image favorable for reproducing the image of the input image 70 is generated. As the dot arrangement of the initial halftone image 80 is closer to that of the finally obtained halftone image, convergence of the optimizing arithmetic operation is faster.

It should be noted that the "halftone image" described herein is not limited to a halftone image itself, but also includes an image generated by simulation while considering one or a plurality of parameters such as a dot density, a dot diameter, a dot shape, a density error of each nozzle, a position error of each nozzle, a head position error, a head tilt error, a sheet feeding error, errors in dot shape and position in a forward route and a backward route in bidirectional printing, and impact interference, based on the halftone image under the assumption of an actual printer output. This means that the "halftone image" includes a simulation image on which characteristics and the like of the printing system are reflected according to a well-known model-based halftone technique.

The second image generation unit 58 convolutes a second low-pass filter 82 into the initial halftone image 80 to generate a low-pass halftone image 84. The low-pass halftone image 84 corresponds to a form of a "second image". This means that the second image generation unit 58 performs processing to generate the low-pass halftone image 84 as a second image obtained by applying the second low-pass filter 82 to the initial halftone image 80 which is a halftone image corresponding to the input image 70.

As the second low-pass filter 82, a visual transfer function or a Gaussian function may be used, similar to the case of the first low-pass filter 72. The second low-pass filter 82 may be a filter different from the first low-pass filter 72. For example, the second low-pass filter 82 may be a filter in which characteristics and the like of the printing system such as a dot density, a dot diameter, and a dot shape are reflected on the first low-pass filter 72.

The third image generation unit 60 performs processing to generate an input-reflected low-pass halftone image 86 from the low-pass input image 74 and the low-pass halftone image 84, which is a third image representing a difference between both images. The input-reflected low-pass halftone image 86 is an image on which each pixel value of the low-pass input image 74 is reflected on each pixel value of the low-pass halftone image 84. As a way of allowing each pixel value of the low-pass input image 74 to be reflected on each pixel value of the low-pass halftone image 84 in such that a difference between the low-pass input image 74 and the low-pass halftone image 84 is shown, there is a case of obtaining a difference and a case of obtaining a ratio. A "difference" is obtained by subtraction between the pixel values. A "ratio" is obtained by a dividing process (division) between the pixel values. "Ratio" is a synonym of quotient.

The third image generation unit 60 may be configured to calculate, as a third image representing a difference between the low-pass input image 74 and the low-pass halftone image 84, a difference (that is, subtraction) between the respective pixel values of the corresponding pixel positions of the low-pass input image 74 and the low-pass halftone image 84 to generate the input-reflected low-pass halftone image 86 in which the value showing the difference is the pixel value.

Further, besides the form of calculating a difference, it is also possible to generate a third image representing a difference between the low-pass input image 74 and the low-pass halftone image 84 by a ratio between the pixel values of the corresponding pixel positions, that is, by a quotient obtained by division. This means that the third image generation unit 60 may be configured to calculate a ratio (quotient by division) between the respective pixel values of the corresponding pixel positions in the low-pass input image 74 and the low-pass halftone image 84, and generate the input-reflected low-pass halftone image 86 in which the value showing the quotient is the pixel value.

Although there is a difference in whether a difference between the low-pass input image 74 and the low-pass halftone image 84 is expressed as a difference or a quotient, in either case, the input-reflected low-pass halftone image 86 is an image in which each pixel value of the low-pass input image 74 is reflected on each corresponding pixel value of the low-pass halftone image.

The focused dot setting unit 62 sets a focused dot which is a particular dot focused as a processing target in the initial halftone image 80. For example, in the case where the total number of dots in the initial halftone image 80 is N pieces, the focused dot setting unit 62 assigns dot numbers, which are integers from 1 to N, to the respective N pieces of dots, and sets a dot number of the focused dot. The dot number serves as an identification code unique to each dot. The focused dot setting unit 62 is able to set a dot having a dot number=1 as a first focused dot, and then sequentially change the focused dot by changing the dot number.

The dot placement pixel determination unit 64 performs processing to determine a dot placement pixel which is a location where a dot is placed when performing dot displacement processing to displace the focused dot, set by the focused dot setting unit 62, to another blank pixel position. Processing to determine a dot placement pixel is referred to as dot placement pixel determination processing. While the detail is described below, the dot placement pixel determination unit 64 performs correction to remove the component of the second low-pass filter corresponding to the focused dot from the input-reflected low-pass halftone image 86, according to the pixel position of the focused dot set by the focused dot setting unit 62, and compares both pixel values within the image of the input-reflected low-pass halftone image 86 after the correction, to thereby specify a dot placement pixel serving as a dot placing location for improving the uniformity of the gradation distribution of the input-reflected low-pass halftone image 86.

"Improving the uniformity of the gradation distribution" means that the input-reflected low-pass halftone image 86 gets close to a uniform image. The input-reflected low-pass halftone image 86 getting close to a uniform image means a difference (that is, error) between the low-pass input image 74 and the low-pass halftone image 84 becomes smaller. Obtaining the low-pass halftone image 84 in which a difference from the low-pass input image 74 is smaller means that it is possible to obtain a halftone image 90 in which the image content of the input image 70 can be reproduced more appropriately. "Improving the uniformity of the gradation distribution" may be expressed as "uniformizing".

In the present embodiment, a focused dot is displaced so as to uniformize the input-reflected low-pass halftone image 86, and consequently, an error between the low-pass input image 74 and the low-pass halftone image 84 is reduced, whereby an optimum halftone image corresponding to the input image 70 is obtained.

The dot displacing unit 66 performs dot displacement processing to displace the focused dot to the position of the dot placement pixel. As a result of dot displacement processing by the dot displacing unit 66, the halftone image 90 having the updated dot arrangement is obtained. It is possible perform updating by rewriting the initial halftone image 80 to the halftone image 90 generated by the dot displacement processing by the dot displacing unit 66, or hold the initial halftone image 80 and also hold the halftone image 90 after the update obtained after the dot displacement processing.

By changing the focused dot and performing dot displacement processing on the respective focused dot, and repeating a work to update the halftone image 90, the dot arrangement becomes optimized.

Along with the dot displacement processing by the dot displacing unit 66, the third image correction unit 68 performs processing to correct the input-reflected low-pass halftone image 86. The third image correction unit 68 performs processing to remove a contribution component of the second low-pass filter 82 corresponding to the focused dot from the input-reflected low-pass halftone image 86, and add, to the input-reflected low-pass halftone image 86, a contribution component of the second low-pass filter 82 corresponding to the focused dot placed on the dot placement pixel by the dot displacement processing performed by the dot displacing unit 66. As a result of correction processing by the third image correction unit 68, a low-pass halftone image 96 in which the pixel value is updated, is obtained. It is possible to perform updating by rewriting the input-reflected low-pass halftone image 86, generated using the initial halftone image 80, to the input-reflected low-pass halftone image 96 generated by the correction processing performing by the third image correction unit 68, or hold the initial input-reflected low-pass halftone image 86 and also hold the input-reflected low-pass halftone image 96 after the update generated by the correction processing performed by the third image correction unit 68.

By repeating a work of performing dot displacement processing within the same image starting from the initial halftone image 80 and updating the halftone image 90 by the new dot arrangement after the dot displacement, the dot arrangement is optimized.

It should be noted that the respective units of data of the low-pass input image 74, the initial halftone image 80, the low-pass halftone image 84, the input-reflected low-pass halftone image 86, the halftone image 90, and the input-reflected low-pass halftone image 96 after the update, generated in the image processing device 20, are held in the memory 42 described in FIG. 2.

The processing function by the first image generation unit 54, described in FIG. 3, corresponds to a form of a first image generating function. The processing function by the second image generation unit 58 corresponds to a form of a second image generating function. The processing function by the third image generation unit 60 corresponds to a form of a third image generating function. The processing function by the focused dot setting unit 62 corresponds to a form of a focused dot setting function. The processing function by the dot placement pixel determination unit 64 corresponds to a form of a dot placement pixel determining function. The processing function by the dot displacing unit 66 corresponds to a form of a dot displacing function.

Figure 4:
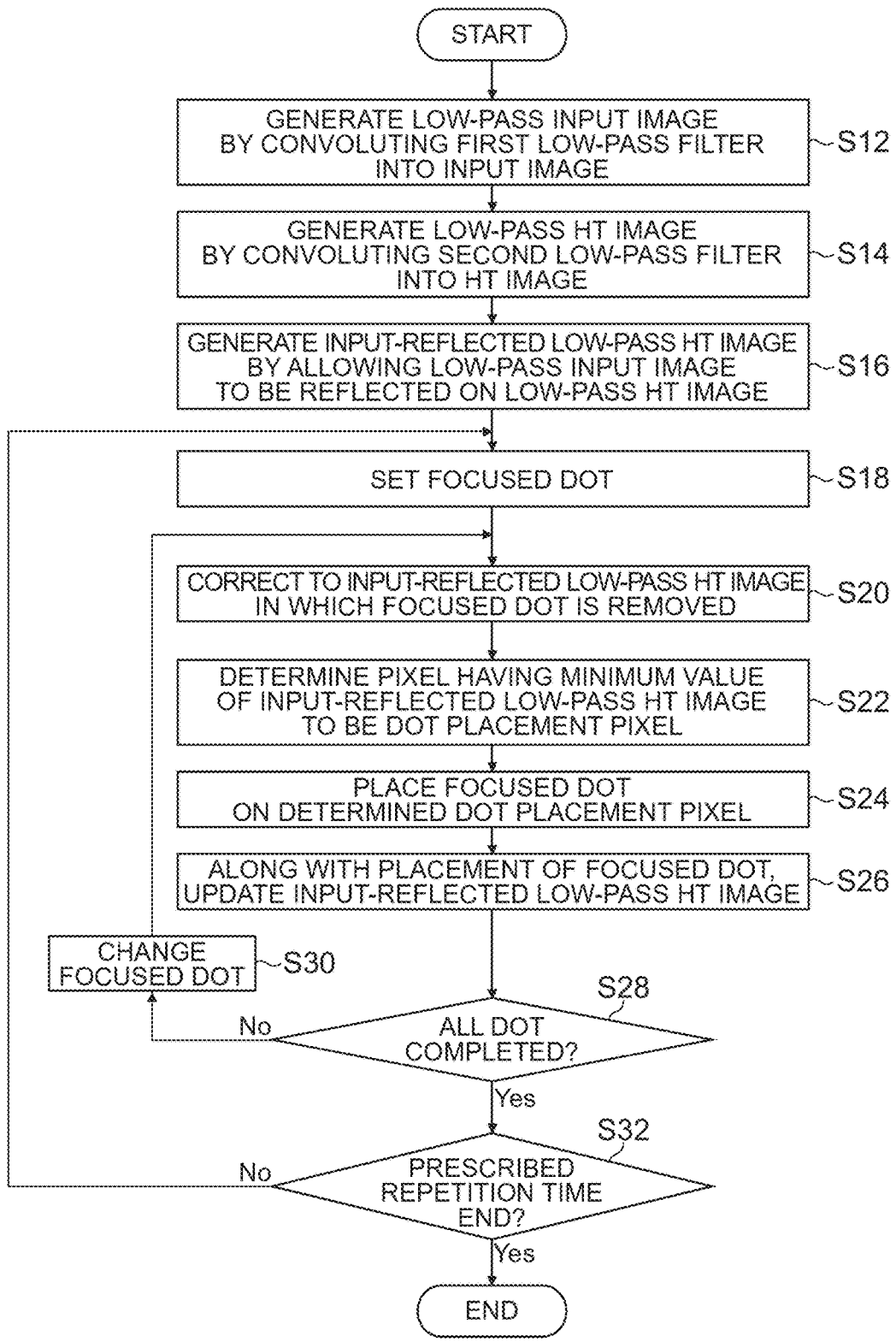
FIG. 4 is a flowchart illustrating a flow of processing performed by the image processing device according to the first embodiment.

FIG. 4 is a flowchart showing a flow of processing performed by the image processing device 20 according to the first embodiment. The image processing method in the flowchart shown in FIG. 4 is carried out by the image processing device 20 described in FIG. 3.

The image processing device 20 generates the low-pass input image 74 by convoluting the first low-pass filter 72 into the input image 70 (step S12 in FIG. 4). The step S12 corresponds to a form of a first image generation step.

Figure 5:
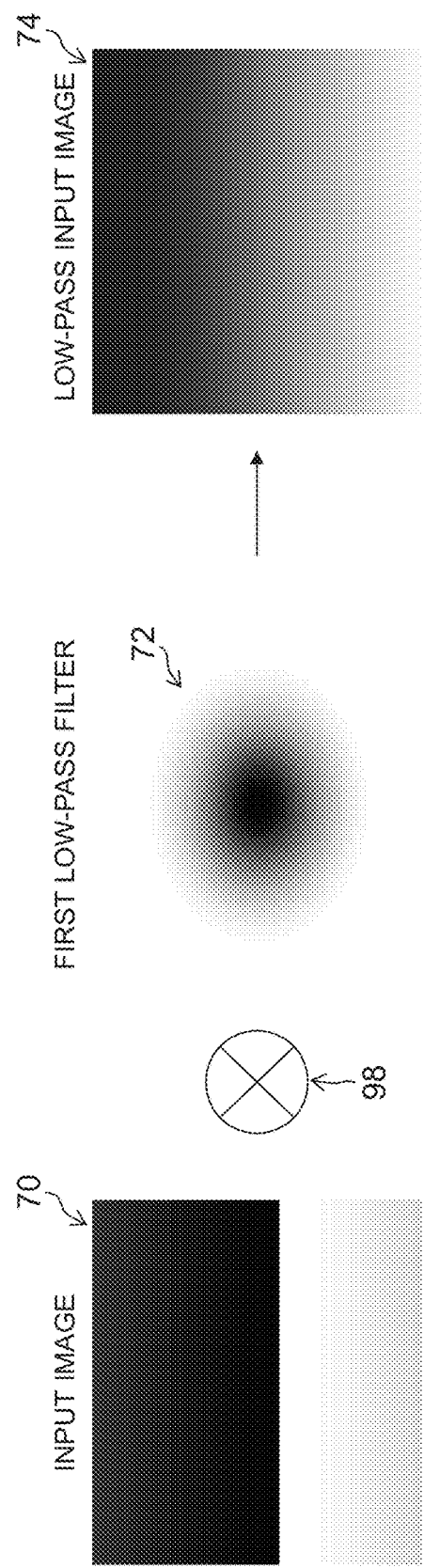
FIG. 5 is an explanatory diagram illustrating a first image generation step with use of a specific image.

FIG. 5 is an explanatory diagram illustrating the first image generation step, shown in step S12 of FIG. 4, with use of a specific image. In order to simplify the description, as an example of the input image 70, FIG. 5 shows a separately-colored pattern in which the upper side of the image is deep and the lower side thereof is light as shown in the drawing. In FIG. 5, the first low-pass filter 72 is one in which the magnitude of the filter coefficient is expressed in gradation. It is shown that the filter coefficient tends to be smaller gradually from the filter center portion toward the outer periphery. In FIG. 5, a mark designated by a reference numeral 98 shows that a convolution operation is performed.

Further, the image processing device 20 generates a low-pass halftone image by convoluting the second low-pass filter 82 into the initial halftone image 80 (step S14 in FIG. 4). The step S14 corresponds to a form of a second image generation step. It should be noted that the step S14 may be carried out before the step of generating the low-pass input image (step S12).

Figure 6:
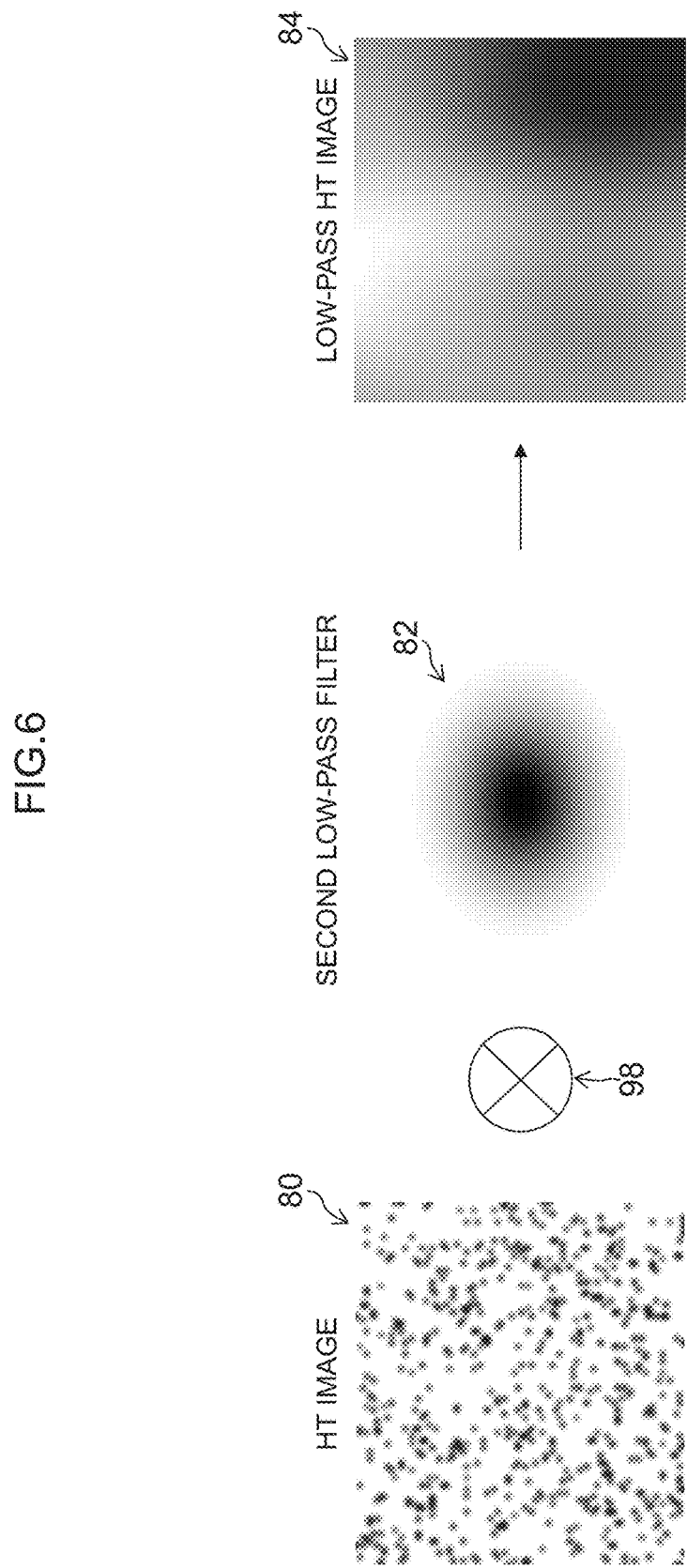
FIG. 6 is an explanatory diagram illustrating a second image generation step with use of a specific image.

FIG. 6 is an explanatory diagram illustrating the second image generation step, shown in step S14 of FIG. 4, with use of a specific image. The halftone image 80 shown in FIG. 6 is one in which the dots in the number of dots defined based on the input image 70 exemplary shown in FIG. 5 are distributed in a dispersed manner arbitrary. In FIG. 6, the second low-pass filter 82 is one in which the magnitude of the filter coefficient is expressed in gradation. It is shown that the filter coefficient tends to be smaller gradually from the filter center portion toward the outer periphery.

After generating the low-pass input image 74 and the low-pass halftone image 84, the image processing device 20 allows the low-pass input image 74 to be reflected on the low-pass halftone image 84, and generates the input-reflected low-pass halftone image 86 showing the difference between them (step S16 in FIG. 4).

As a way of reflection, if a difference between the low-pass halftone image 84 and the low-pass input image 74 is taken, the input-reflected low-pass halftone image 86 is generated according to the following Expression 1:

$$RIN\_F\_HT(x,y)=F\_HT(x,y)-F\_IN(x,y) \quad \text{(Expression 1)}.$$

Here, x, y represent the position of the pixel, and RIN_F_HT(x, y) represents an input-reflected low-pass halftone image at x, y. F_HT(x, y) means a low-pass halftone image at x, y, and F_IN(x, y) means a low-pass input image at x, y.

Further, as a way of reflection, when the ratio (that is, quotient) between the low-pass halftone image 84 and the low-pass input image 74 is calculated, the input-reflected low-pass halftone image 86 is generated according to the following Expression 2:

$$RIN\_F\_HT(x,y)=F\_HT(x,y)/F\_IN(x,y) \quad \text{(Expression 2)}.$$

When a quotient is calculated, in order to prevent division by a denominator "0", it is preferable to add a minute value (for example, 1 or the like) to F_IN(x, y).

The step S16 corresponds to a form of a third image generation step.

Then, the image processing device 20 sets a focused dot (step S18). For example, the image processing device 20 assigns a unique identification code to each dot in the dot arrangement of the initial halftone image 80, and specifies a focused dot to be processed. As identification codes unique to the respective dots, dot numbers which are integers from 1 to N may be assigned. As a first focused dot, a dot having a dot number=1 may be set as a focused dot. The step S18 corresponds to a form of a focused dot setting step.

Then, the image processing device 20 performs processing to correct the input-reflected low-pass halftone image 86 which corresponds to the case when the focused dot is removed from the halftone image 80 (step S20). Specifically, a contribution component of the second low-pass filter 82 corresponding to the focused dot is removed from the input-reflected low-pass halftone image 86, as Expression 3 or Expression 4 described below.

If the input-reflected low-pass halftone image 86 is defined by Expression 1 in which a difference between the low-pass halftone image 84 and the low-pass input image 74 is calculated, the input-reflected low-pass halftone image 86 is corrected, as shown in the following Expression 3:

$$RIN\_F\_HT(x0+i,y0+j) \leftarrow RIN\_F\_HT(x0+i,y0+j)-F_2(i,j) \quad \text{(Expression 3)}.$$

Here, (x0, y0) represents a position of the focused dot, (i, j) represents a position of the second low-pass filter with the center being (x0, y0), and $F_2(i, j)$ represents the second low-pass filter.

However, if a plurality of dot types are mixed in the halftone image, the second low-pass filter $F_2(i, j)$ corresponding to each dot type differs.

Expression 3 means that RIN_F_HT(x0+i, y0+j)−$F_2$(i, j), calculated by subtracting $F_2$(i, j) from RIN_F_HT(x0+i, y0+j), is set as new RIN_F_HT(x0+i, y0+j) after the correction.

Meanwhile, if the input-reflected low-pass halftone image 86 is defined by Expression 2 in which a quotient between the low-pass halftone image 84 and the low-pass input image 74 is calculated, the input-reflected low-pass halftone image 86 is corrected as shown in the following Expression 4:

$$RIN\_F\_HT(x0+i,y0+j) \leftarrow RIN\_F\_HT(x0+i,y0+j) - (F_2(i,j)/F\_IN(x0+i,y0+j)) \quad \text{(Expression 4).}$$

Expression 4 means that RIN_F_HT(x0+i, y0+j)−($F_2$(i, j)/F_IN(x0+i, y0+j)), calculated by subtracting $F_2$(i, j)/F_IN(x0+i, y0+j) from RIN_F_HT(x0+i, y0+j), is set as new RIN_F_HT(x0+i, y0+j) after the correction.

Then, the image processing device 20 determines a pixel having a minimum value of the input-reflected low-pass filter image, corrected by Expression 3 or Expression 4, to be a dot placement pixel (step S22 in FIG. 4). The step S22 corresponds to a form of a dot placement pixel determination step. When determining a dot placement pixel, while it is possible to use all of the blank pixels within the image as candidates and search for a pixel showing a minimum value from the entire range of the image, it is not necessary to use the entire range of the image as a target. As the dots in the halftone image are sparsely arranged in a dispersed manner in their way, it is preferable to search for a pixel showing a minimum value by using a limited range of the image near the pixel position of the focused dot as a target.

For example, among the blank pixels as candidates within a predetermined range near the pixel position (x0, y0) of the focused dot, the image processing device 20 determines a pixel having a minimum value of the input-reflected low-pass filter image, corrected by Expression 3 or Expression 4, to be a dot placement pixel (step S22 in FIG. 4).

A nearby predetermined range as a candidate may be set according to a dot number density. As an example, in the case where N pieces of dots are distributed dispersedly in an almost uniform manner in an image area having M pieces of pixels, in respective directions of an x-axis direction and a y-axis direction, a pixel range of almost $(M/N)^{1/2}$ can be set as a nearby predetermined range, provided that M and N in this case are integers satisfying 0<N<M.

Then, the image processing device 20 places the focused dot on the dot placement pixel determined at step S22 (step S24). If the position of the dot placement pixel is shown by (x1, y1), the processing at step S24 corresponds to displacing the focused dot from the pixel position (x0, y0) to the pixel position (x1, y1). Through this displacement processing, the dot arrangement of the halftone image is updated. The step S24 corresponds to a form of a dot displacement step.

Along with the placement of the focused dot at step S24, the image processing device 20 updates the input-reflected low-pass halftone image as shown in Expression 5 or Expression 6 described below (step S26).

If the input-reflected low-pass halftone image 86 is defined by Expression 1 in which a difference between the low-pass halftone image 84 and the low-pass input image 74 is calculated, the input-reflected low-pass halftone image 86 is corrected as shown in the following Expression 5:

$$RIN\_F\_HT(x1+i,y1+j) \leftarrow RIN\_F\_HT(x1+i,y1+j) + F_2(i,j) \quad \text{(Expression 5).}$$

This means that adding $F_2$(i, j), which is the second low-pass filter, to RIN_F_HT(x1+i, y1+j), which is the input-reflected low-pass halftone image before update, results in RIN_F_HT(x1+i, y1+j) which is an input-reflected low-pass halftone image after the update.

Meanwhile, if the input-reflected low-pass halftone image 86 is defined by Expression 2 in which a quotient between the low-pass halftone image 84 and low-pass input image 74 is calculated, the input-reflected low-pass halftone image 86 is corrected as shown in the following Expression 6:

$$RIN\_F\_HT(x1+i,y1+j) \leftarrow RIN\_F\_HT(x1+i,y1+j) + (F_2(i,j)/F\_IN(x1+i,y1+j)) \quad \text{(Expression 6).}$$

Expression 6 means that RIN_F_HT(x1+i, y1+j)+($F_2$(i, j)/F_IN(x1+i, y1+j)), calculated by adding $F_2$(i, j)/F_IN(x0+i, y0+j) to RIN_F_HT(x1+i, y1+j) is set as new RIN_F_HT (x1+i, y1+j) after the correction.

Then, the image processing device 20 decides whether or not processing of displacing the entire dots has been completed (step S28). If there is any unprocessed dot, the decision at step S28 is No. If the decision at step S28 is No, the image processing device 20 changes the focused dot (step S30), and returns to step S20. In this way, in processing from step S20 to step S28 is repeated while changing the focused dot sequentially.

When the processing of displacing the entire dot has been completed, the decision at step S28 becomes Yes, and the processing proceeds to step S32. Once the focused dot makes one round of the entire dots, processing on the entire dots is completed, and the decision at step S28 becomes Yes. For example, if there are 200 pieces of dots in the initial halftone image 80, displacement is performed sequentially from the dot number 1, and when displacement of the dot number 200 ends, displacement of the entire dots is considered to be completed.

When the focused dot makes one round of the entire dots and displacement of the entire dots is completed, the dot arrangement state in the halftone image is changed from the initial halftone image as a whole. This means that regarding the focused dot having been set first, the surrounding dot arrangement state has been changed. As such, setting of the focused dot is performed again from the state where the focused dot has make one round of the entire dots, and displacement of a dot is repeated from a dot having a dot number 1. By performing such displacement processing repeatedly several times, the dot arrangement is optimized gradually, whereby it is possible to reach a good halftone image.

At step S32, whether or not the processing can be ended is decided. As a method of ending the processing, various types of method may be considered.

Step S32 shown in FIG. 4 is an ending decision in the case of repeating one round of displacement a predetermined number of times and ending the processing. In this example, the predetermined number of times is set in advance, and decision is made by counting the repetition number of times that displacement of the entire dots makes one round.

When the number of times that the displacement processing, in which the focused dot makes one round of the entire dots, is performed does not satisfy the predetermined number of repetition times, the decision at step S32 becomes No, and the processing returns to step S18. In that case, the initial halftone image 80 is replaced with the latest halftone image 90 after the update, and dot displacement processing is performed by setting a focused dot on the latest halftone image 90 (step S18 to step S28).

When the processing is performed the predetermined number of repetition times and the decision at step S32 becomes Yes, the processing is ended.

Concerning a method of deciding whether or not the processing can be ended for determining whether or not to end the processing, methods exemplary shown below may be adopted instead of the method of determining whether the number of repetition times satisfies the predetermined number of times (for example, ten times) described in step S32, or in combination therewith.

[Another Deciding Method 1]

It is possible to adopt a configuration of calculating an average value of the pixel values of the entire pixels in the input-reflected low-pass halftone image 86 in advance, and deciding whether or not a difference between the average value and the minimum value of the input-reflected low-pass halftone image 96 after the update enters a prescribed allowable range having been set. In this case, the processing is ended when the difference between the average value and the minimum value of the input-reflected low-pass halftone image 96 after the update enters the prescribed allowable range having been set.

[Another Deciding Method 2]

It is possible to adopt a configuration of deciding whether or not a difference between the maximum value and the minimum value of the input-reflected low-pass halftone image 96 after the update becomes equal to or smaller than a prescribed value having been set. In this case, the processing is ended when the difference between the maximum value and the minimum value becomes equal to or smaller than the prescribed value.

[Another Deciding Method 3]

It is possible to adopt a configuration of deciding whether or not the minimum value of the input-reflected low-pass halftone image 96 after the update becomes equal to or larger than a reference value having been set. In this case, the processing is ended when the minimum value becomes equal to or larger than the reference value.

[Another Deciding Method 4]

It is possible to adopt a configuration of counting the number of times that the position of the focused dot is changed (that is, the number of times that (x0, y0) and (x1, y1) do not match) regarding each focused dot from the time when the focused dot is first set to the time when the focused dot makes one round of the entire dots, and deciding whether or not the number of times that the position is changed becomes equal to or smaller than the prescribed number of times having been set. In this case, the processing is ended when the number of times that the position of the focused dot is changed becomes equal to or smaller than the prescribed value.

Such a deciding method can be changed as follows: that is, it is possible to adopt a configuration of counting the number of times that the position of the focused dot is unchanged (that is, the number of times that (x0, y0) and (x1, y1) match) regarding each focused dot from the time when the focused dot is first set to the time when the focused dot makes one round of the entire dots, and deciding whether or not the number of times that the position is unchanged becomes equal to or larger than the predetermined number of times having been set. In this case, the processing is ended when the number of times that the position of the focused dot is unchanged becomes equal to or larger than the predetermined value.

It should be noted that as for the other deciding methods 1 to 3 exemplary shown above, it is possible to insert the step of deciding whether or not the processing can be ended after the step S26 before the step S28 in FIG. 4.

[Description with Specific Images]

Figure 7:
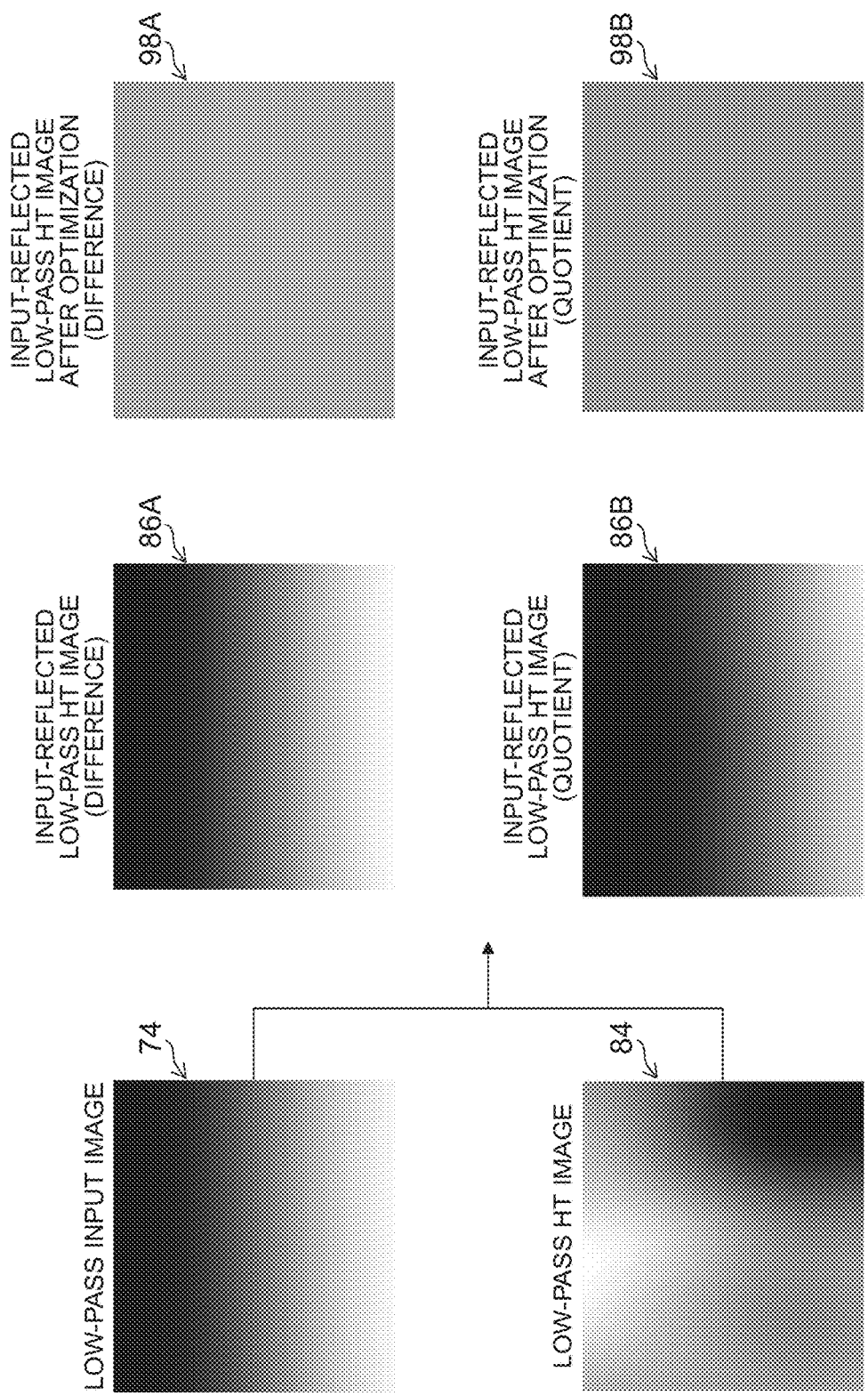
FIG. 7 is an explanatory diagram illustrating image processing of the present embodiment with use of a specific image.

FIG. 7 is an explanatory diagram illustrating the processing content after step S16 in FIG. 4, with use of specific images. The low-pass input image 74 shown in FIG. 7 is an image obtained by convoluting the first low-pass filter 72 into the input image 70 described in FIG. 5. The low-pass halftone image 84 shown in FIG. 7 is an image obtained by convoluting a second low-pass filter into the halftone image 80 described in FIG. 6. However, in order to make the drawing easily understandable, the shading scales (changing ranges) of the respective images in FIG. 7 are adjusted appropriately, and the scales are not uniformed between the images. For example, the changing range of the shade in the low-pass halftone image 84 is sufficiently smaller than the changing range of the shade in the low-pass input image 74.

The input-reflected low-pass halftone image 86A shown in FIG. 7 is an image representing a difference between the low-pass input image 74 and the low-pass halftone image 84, obtained through subtraction of the pixel values of the corresponding pixels in both images.

An image designated by a reference numeral 98A in FIG. 7 is an input-reflected low-pass halftone image after the optimization which is obtained by repeating the dot displacement processing in accordance with the flowchart described in FIG. 4 to thereby optimize the dot arrangement. From the state of a non-uniform input-reflected low-pass halftone image, designated by a reference numeral 86A, an almost uniform input-reflected low-pass halftone image, designated by a reference numeral 98A, is finally obtained.

Further, the input-reflected low-pass halftone image 86B shown in FIG. 7 is an image representing a quotient between the low-pass input image 74 and the low-pass halftone image 84, obtained through division performed on the pixel values of the corresponding pixels in both images.

The image designated by a reference numeral 98B in FIG. 7 is an input-reflected low-pass halftone image after optimization, obtained by repeating the dot displacement processing in accordance with the flowchart described in FIG. 4 to thereby optimize the dot arrangement. From the state of the input-reflected low-pass halftone image having non-uniform gradation distribution, designated by a reference numeral 86B, an input-reflected low-pass halftone image having almost uniform gradation distribution, designated by the reference numeral 98B, is finally obtained.

According to the flowchart of FIG. 4, updating of the halftone image by the dot displacement processing performed on the halftone image, and updating of the input-reflected low-pass halftone image accompanying the dot displacement processing, are performed in conjunction with each other. As such, at the same time that the uniform input-reflected low-pass halftone image 98A or 98B, as shown in FIG. 7, is obtained, a halftone image having an optimum dot arrangement corresponding to the input image 70 can be obtained.

Comparative Example

Here, a typical DBS method according to a comparative example is described, and a difference from the image processing method according to the present embodiment is described.

Figure 8:
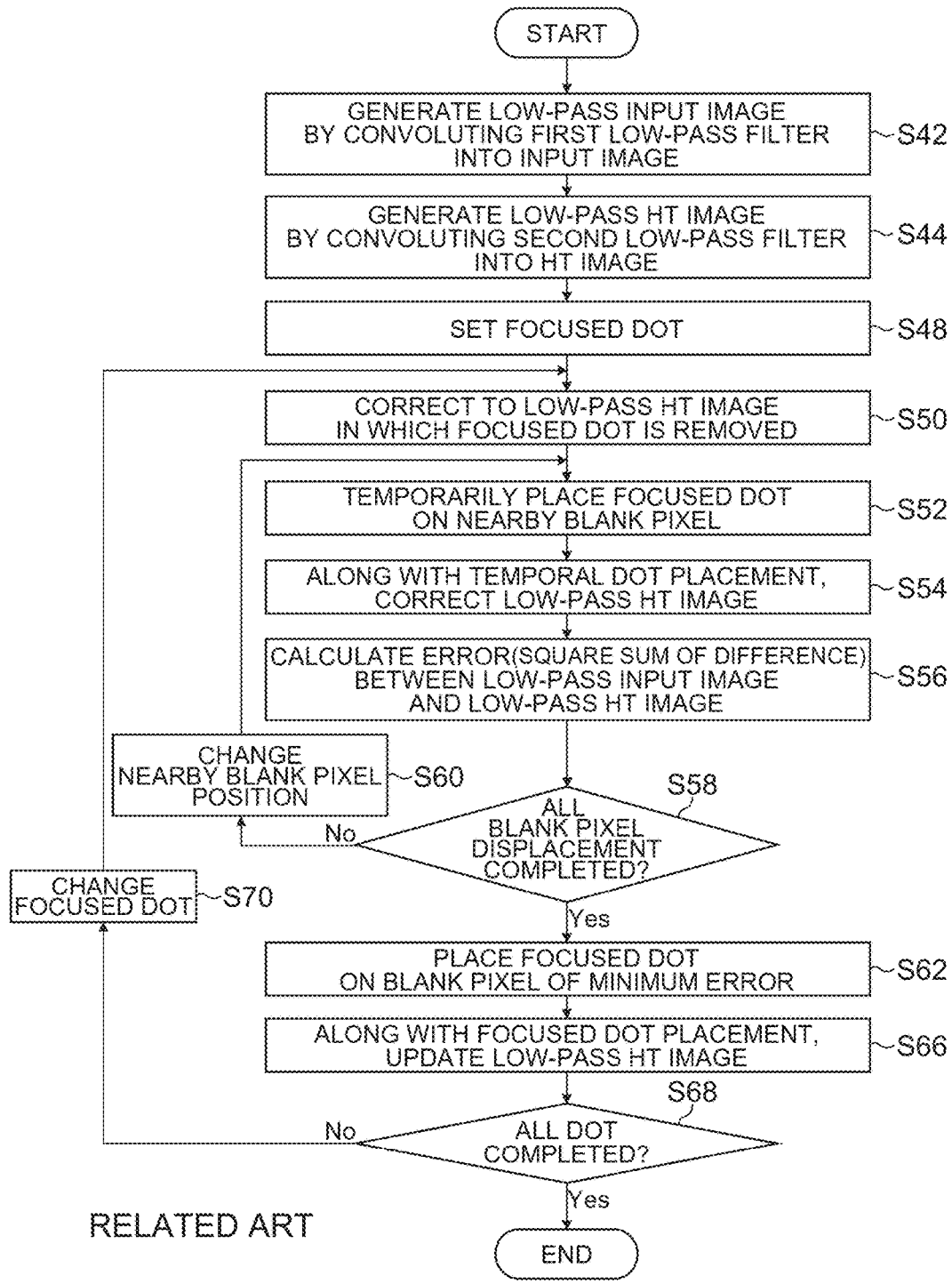
FIG. 8 is a flowchart illustrating a flow of processing by the DBS method according to a comparative example.

FIG. 8 is a flowchart illustrating a flow of processing according to a DBS method of a comparative example.

At step S42, a low-pass input image is generated by convoluting a first low-pass filter into an input image (step S42 in FIG. 8).

At step S44, a low-pass halftone image is generated by convoluting a second low-pass filter into an initial halftone image (step S44 in FIG. 8). Steps S42 and S44 are steps similar to steps S12 and S14 described in FIG. 4.

Then, in the DBS method shown in FIG. 8, a focused dot is set in the initial halftone image (step S48) and correction is performed to generate a low-pass halftone image corresponding to the halftone image of the case where the focused dot is removed (step S50).

Then, processing to temporarily place the focused dot on a nearby blank pixel is performed (step S52). Along with the temporal dot placing, the low-pass halftone image is corrected (step S54). This means that at step S54, it is corrected to a low-pass halftone image corresponding to the halftone image after the temporal dot placing.

Then, an error between the low-pass input image and the low-pass halftone image is calculated (step S56). The error calculated at step S56 is an evaluation index which evaluates the difference between the low-pass input image and the low-pass halftone image. Specifically, the square sum of the difference between the pixel values of the corresponding pixels in both images is calculated.

Next, it is decided whether or not displacement by the temporal dot placing has been completed for the entire blank pixels within the image area near the set focused dot (step S58). If the decision at step S58 becomes No, the processing proceeds to step S60 so as to change the position of the nearby blank pixel, and then returns to step S52.

Upon completion of the calculation of the error between the low-pass input image and the low-pass halftone image by the temporal dot placing for the entire blank pixel positions near the set focused dot (step S56), the decision at step S58 becomes Yes, and the processing proceeds to step S62.

At step S62, a position of a blank pixel at which the error calculated at step S56 is minimized is specified, and the focused dot is placed on the blank pixel having the minimum error. Then, along with setting of the focused dot at step S62 (that is, dot displacement), the low-pass halftone image is updated (step S66). At step S66, a low-pass halftone image, corresponding to the halftone image after the dot displacement, is generated.

Then, the processing proceeds to step S68, and as for the entire (all) dots in the halftone image, it is decided whether or not setting of a focused dot and displacement processing have been completed.

If the decision at step S68 is No, the focused dot is changed (step S70), and the processing returns to step S50. When the displacement processing has been completed for the entire dots and decision at step S68 is Yes, the processing is ended.

Although not shown in FIG. 8, the processing flow of FIG. 8 is repeated until the error calculated at step S56 takes a value equal to or smaller than a predetermined value.

In the DBS method according to the comparative example, at step S50, arithmetic operation is performed to remove a low-pass filter, corresponding to the focused dot, from the low-pass halftone image as shown in the following Expression 7:

$$F\_HT(x0+i,y0+j) \leftarrow F\_HT(x0+i,y0+j) - F(i,j) \quad \text{(Expression 7)}.$$

Then, at step S52 to step S54, a low-pass filter corresponding to the focused dot is temporarily added to a blank pixel which is a candidate of a nearby predetermined range as shown in the following Expression 8, and at step S56, a square error is calculated according to Expression 9. A "square error" is a synonym of a square sum of an error.

$$F\_HT(x1+i,y1+j) \leftarrow F\_HT(x1+i,y1+j) + F(i,j) \quad \text{(Expression 8)}$$

$$\Sigma(F\_HT(x,y) - F\_IN(x,y))^2 \quad \text{(Expression 9)}$$

"$\Sigma$" in Expression 9 means that the total sum is calculated for the entire pixels.

At step S60, the position of the blank pixel for temporal placing is changed, and a square error defined in Expression 9 is calculated for each candidate blank pixel, and at step S62, the dot is actually displaced to a blank pixel in which the value of the square error is minimized.

Then, along with the placement of the focused dot, at step S66, the low-pass halftone image is updated according to the following Expression 10:

$$F\_HT(x1+i,y1+j) \leftarrow F\_HT(x1+i,y1+j) + F(i,j) \quad \text{(Expression 10)}.$$

Figure 9:
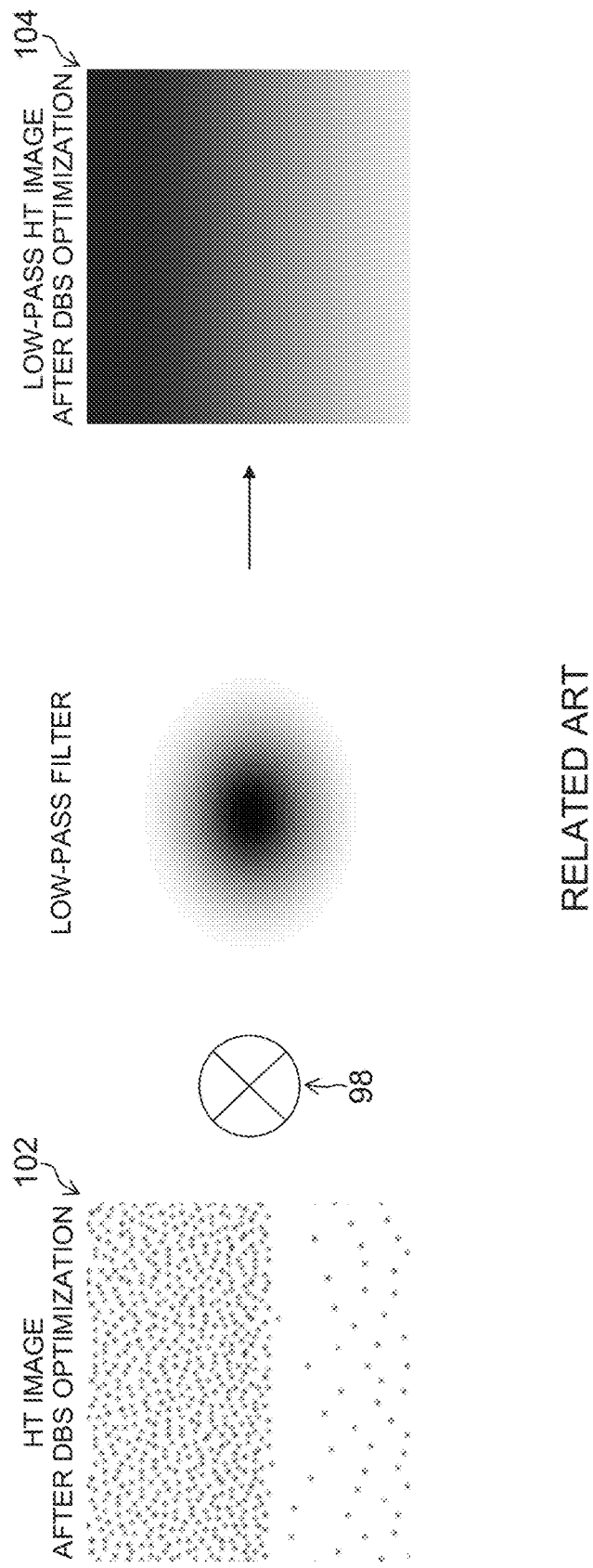
FIG. 9 is an explanatory diagram illustrating image processing of the DBS method according to a comparative example with use of a specific image.

FIG. 9 illustrates examples of a halftone image and a low-pass halftone image obtained finally through repetition of such processing.

A reference numeral 102 in FIG. 9 designates a halftone image after the optimization by the DBS method of the comparative example, and a reference numeral 104 designates a low-pass halftone image after the optimization by the DBS method of the comparative example.

In the DBS method of the comparative example, after removing a contribution component of the low-pass filter corresponding to the focused dot from the low-pass halftone image 84 described in FIG. 6, the dot is temporarily placed on a candidate blank pixel. Then, the low-pass filter is placed on the pixel corresponding to the temporal placing position, processing is performed to calculate a square error which is an evaluation value, by changing the temporal placing position sequentially, similar calculation of evaluation values is performed for all of the candidate blank pixels, and from among them, it is determined to "place the dot" at a pixel position where the evaluation value becomes the best, that is, a pixel position where the square error is minimized.

In such a DBS method of the comparative example, it is necessary to perform trial arithmetic operation to search for a dot placement position where an error between the low-pass halftone image and the low-pass input image is minimized (that is, a square error as an evaluation value is minimized) so as to allow the low-pass halftone image to be close to the low-pass input image. As such, the amount of arithmetic operation for obtaining an optimum halftone image is increased considerably.

On the other hand, the embodiment of the present invention introduces an input-reflected low-pass halftone image, and adopts an arithmetic operation method of uniformizing the input-reflected low-pass halftone image to thereby reduce the error between the low-pass input image and the low-pass halftone image, consequently. As such, in the present embodiment, dot displacement is performed by specifying the position of the dot placement pixel on which the focused dot is placed based on the comparison between the pixel values within the image of the input-reflected low-pass halftone image so as to make the input-reflected low-pass halftone image uniform.

According to the present embodiment, the pixel value of the input-reflected low-pass halftone image can be used as an evaluation index as it is, and it is possible to easily specify the pixel position where the focused dot should be placed, based on the comparison of the magnitude relation between the pixel values within the image of the input-reflected low-pass halftone image, without calculating another evaluation value such as a square error.

Accordingly, it is possible to generate an optimum halftone image with a smaller amount of arithmetic operation, compared with the DBS method of the comparative example.

Second Embodiment

The first embodiment is based on the premise that the input gradation and density are in a proportional relation, and the gradation and the number of dots and the density are in a proportional relation. Precisely, however, they are not in a proportional relation. As such, the input gradation and the gradation and the number of dots may be converted to "density".

That is to say, as for an input image, after converting each gradation value of an input image to a density value according to the following Expression 11:

$$D\_IN(x,y)=D_1(IN(x,y)) \qquad \text{(Expression 11)},$$

$F_1(i, j)$, which is a first low-pass filter, is convoluted into $D\_IN(x, y)$ to thereby generate a low-pass input image $F\_IN(x, y)$.

$IN(x, y)$ represents a gradation value at a pixel position (x, y) of the input image. A function $D_1(*)$ represents a conversion function for converting a gradation value of an input as a variable "*" into an optical density value. In this example, a density value is an optical density value. $D\_IN(x, y)$ represents a value obtained by converting a gradation value $IN(x, y)$ of an input into a density value by the function $D_1(*)$.

Further, as for the halftone image, after converting the gradation value of each dot of the halftone image into a density value according to the following Expression 12:

$$D\_HT(x,y)=D_2(HT(x,y),n1,n2\ldots) \qquad \text{(Expression 12)},$$

a second low-pass filter $F_2(i, j)$ is convoluted into $D\_HT(x, y)$ to thereby generate a low-pass halftone image $F\_HT(x, y)$.

In Expression 12, it is meant that the function $D_2(*)$ is a function depending on the gradation value of a dot and the number of surrounding dots, and that $D(HT(x, y), n1, n2 \ldots)$ means to convert the gradation value $HT(x, y)$ of the dot at x, y, within the predetermined range around x, y of the halftone image, into a density, depending on the number of dots n1 of a dot type 1, the number of dots n2 of a dot type 2, and the like. The dot type is a type of a dot in the case where dots of different dot sizes can be used differently. For example, in the case where three types of dots including a small dot, an intermediate dot, and a large dot, can be used differently, dot types are defined in such a manner that dot type 1=small dot, dot type 2=intermediate dot, and dot type 3=large dot. A gradation value of a dot corresponds to a dot type. For example, in the case where gradation of dots are expressed in four gradation values including no dot, a small dot, an intermediate dot, and a large dot, it is possible to associate a dot gradation value=0 with "no dot", a dot gradation value=1 with a "small dot", a dot gradation value=2 with an "intermediate dot", and a dot gradation value=3 with a "large dot", respectively.

The second embodiment is configured such that even at the time of correction to the input-reflected low-pass halftone image, in which the focused dot is removed, at step S20 described in FIG. 3, the component of the second low-pass filter $F_2(i, j)$, to which the density $D\_HT(x, y)$ of the focused dot is applied, is removed. Further, when the input-reflected low-pass halftone image is updated along with the placement of the focused dot at step S26 described in FIG. 3, a component of the second low-pass filter $F_2(i, j)$, to which the density $D\_HT(x, y)$ of the focused dot is applied, is added.

Figure 10:
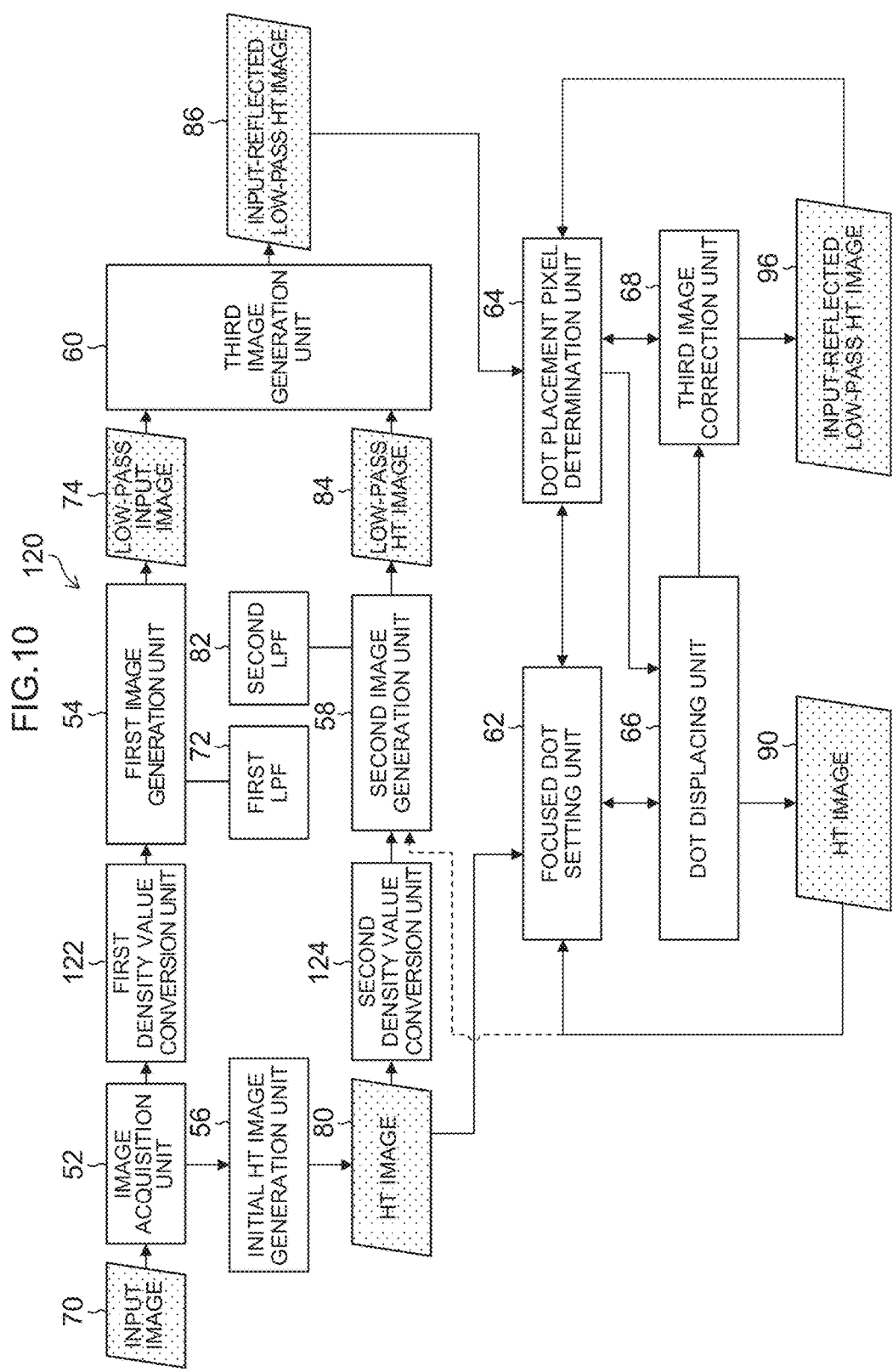
FIG. 10 is a functional block diagram of an image processing device of a second embodiment.

FIG. 10 is a block diagram illustrating an image processing device 120 according to the second embodiment. In FIG. 10, elements which are identical or similar to those in the configuration described in FIG. 3 are designated by the same reference numerals or reference characters, and the description thereof is omitted. The image processing device 120 in FIG. 10 includes a first density value conversion unit 122 and a second density value conversion unit 124.

The first density value conversion unit 122 performs processing to convert a gradation value of each pixel in the input image 70 into a density value. The first density value conversion unit 122 converts a gradation value into a density value according to Expression 11. It should be noted that the conversion function $D1(*)$ used in conversion processing by the first density value conversion unit 122 may be defined as a mathematical expression or defined as a lookup table.

The second density value conversion unit 124 performs processing to convert a gradation value of a dot of each pixel in the halftone image 80 into a density value. The second density value conversion unit 124 converts a gradation value into a density value according to Expression 12. The conversion function $D2(*)$ used in conversion processing by the second density value conversion unit 124 may be defined as a mathematical expression or defined as a lookup table.

The first image generation unit 54 in the second embodiment applies the first low-pass filter 72 to the image obtained by converting the input image 70 to have a density value by the first density value conversion unit 122 to thereby generate the low-pass input image 74.

The second image generation unit 58 in the second embodiment applies the second low-pass filter 82 to the image obtained by converting the halftone image 80 to have a density value by the second density value conversion unit 124 to generate the low-pass halftone image 84.

Further, the dot placement pixel determination unit 64 in the second embodiment performs processing to remove the component of the second low-pass filter $F_2(i, j)$, to which the density $D\_HT(x, y)$ of the focused dot is applied, when performing correction to the input-reflected low-pass halftone image in which a contribution component of the focused dot is removed. Further, the third image correction unit 68 in the second embodiment adds a component of the second low-pass filter $F_2(i, j)$, to which the density $D\_HT(x, y)$ of the focused dot is applied, when updating the input-reflected low-pass halftone image along with dot placement by the dot displacing unit 66.

It should be noted that if a plurality of dot types are mixed in the halftone image, a different second low-pass filter $F_2(i, j)$ corresponding to each dot type is used for each dot type.

<Variation 1 of Embodiment>

In the first embodiment and the second embodiment, description has been given on the examples in which the input-reflected low-pass halftone image 86 generated by the third image generation unit 60 is held in the memory 42 (see FIG. 2), and along with dot displacement, the input-reflected low-pass halftone image 96 after the correction, generated by the third image correction unit 68, is held.

However, when carrying out the present invention, it is not always required to hold the generated input-reflected low-pass halftone images 86 and 96. For example, it is acceptable to hold only the low-pass input image 74 and the low-pass halftone image 84, and when performing pixel value evaluation at the time of determining a dot placement pixel, calculate a value corresponding to the input-reflected low-pass halftone image as required.

<Variation 2 of Embodiment>

While, in the first embodiment and the second embodiment, a focused dot is displaced to a pixel having a minimum value in the input-reflected low-pass halftone image, the dot placement pixel is not necessarily a pixel having a minimum value in the input-reflected low-pass halftone image. For example, it is acceptable to handle, as candidates, all pixels having a value smaller by a prescribed value than the pixel value corresponding to the position of the focused dot or a further smaller value, among blank pixels as candidates within a predetermined range of the input-reflected low-pass halftone image, and from among the candidates, selecting one dot placement pixel randomly or while considering other indexes or arrangement restraints, and displace the focused dot to the selected dot placement pixel.

A "prescribed value" serving as a basis for determining a candidate may be a fixed value having been set or may be changed each time a dot is displaced. Further, when changing the prescribed value, it is possible to include a negative value. Using a negative value as the prescribed value means including a pixel having a pixel value larger than a pixel value corresponding to the position of the focused dot in the candidates. The grounds for allowing a negative value as the prescribed value are to reach an optimum solution without plunging into a partial local optimum solution, similar to the case of a simulated annealing method. A prescribed value is changed within the range where such grounds are achieved.

As the other indexes, indexes evaluating granular or stripe-like image defects, or image quality such as density unevenness or banding, indexes such as a dot converge, or appropriate combinations of these indexes, may be adopted, for example.

As the arrangement constraints, a constraint of limiting to a pixel having an adjacent dot or limiting to a pixel having no adjacent dot, or a constraint of limiting to a pixel corresponding to a particular nozzle or a particular scanning path, or limiting to a pixel not corresponding to a particular nozzle or a particular scanning path, may be adopted, for example. An arrangement constraint in which these constraints are combined appropriately may also be adopted.

In the DBS method described in the comparative example, the entire blank pixels within a nearby predetermined range are used as candidates and the trial arithmetic operation is repeated. Meanwhile, according to the present embodiment, as the pixels used as candidates are narrowed down based on the pixel value of the input-reflected low-pass halftone image, determination of a dot placement pixel is easy. In particular, according to the present embodiment, it is possible to specify one dot placement pixel according to a simple rule, based on comparison between pixel values in the input-reflected low-pass halftone image. The simple rule includes a rule of using a pixel of a minimum value which has been described above, or a rule of combining narrowing down of candidates according to a prescribed value and selection using a random number or the like. According to the present embodiment, it is possible to obtain a halftone image having an optimum dot arrangement with a small amount of arithmetic operation.

Further, when comparing pixel values in the input-reflected low-pass halftone image, it is also possible to divide the pixels in groups and compare pixel values in group units, without limiting to the case of comparing pixel values one to one in pixel units.

<Variation 3 of Embodiment>

Regarding generation of the input-reflected low-pass halftone image described in step S16 of FIG. 4, it is possible to use Expression 13 in which the first member and the second member on the right side of Expression 1, having been described, are exchanged.

That is to say, as a method of allowing the low-pass input image to be reflected on the low-pass halftone image, in the case of obtaining a "difference" between the two, the following Expression 13 can be used instead of Expression 1:

$$RIN\_F\_HT(x,y)=F\_IN(x,y)-F\_HT(x,y) \quad \text{(Expression 13).}$$

In this case, as for the arithmetic operation of removing the focused dot from the input-reflected low-pass halftone image at step S20, the following Expression 14 is used instead of Expression 3:

$$RIN\_F\_HT(x0+i,y0+j) \leftarrow RIN\_F\_HT(x0+i,y0+j)+F_2(i,j) \quad \text{(Expression 14).}$$

Then, instead of determining a pixel having a minimum value of the input-reflected low-pass halftone image to be a dot placement pixel at step S22 in FIG. 4, a pixel having a maximum value of the input-reflected low-pass halftone image corrected by Expression 14, or a pixel having a value larger by a prescribed value than a pixel value corresponding to the focused dot position or further larger value, is determined to be a dot placement pixel. The prescribed value may be a fixed value, or may be changed each time a dot is displaced. When changing the prescribed value, a negative value may be included.

In this way, the focused dot is placed on the determined dot placement pixel (step S24), and along with the placement of the focused dot, at step S26, the input-reflected low-pass halftone image is updated using the following Expression 15 instead of Expression 5:

$$RIN\_F\_HT(x1+i,y1+j) \leftarrow RIN\_F\_HT(x1+i,y1+j)-F_2(i,j) \quad \text{(Expression 15).}$$

<Variation 4 of Embodiment>

Regarding generation of the input-reflected low-pass halftone image described in step S16 of FIG. 4, it is possible to use Expression 16 in which the denominator and the numerator of the right side of Expression 2, having been described, are exchanged.

That is to say, as a method of allowing the low-pass input image to be reflected on the low-pass halftone image, in the case of obtaining a "quotient" between the two, the following Expression 16 may be used instead of Expression 2:

$$RIN\_F\_HT(x,y)=F\_IN(x,y)/F\_HT(x,y) \quad \text{(Expression 16).}$$

It should be noted that in order to prevent division by a denominator "0", it is preferable to add a minute value (for example, 1 or the like) to F_HT(x, y).

In this case, as for the arithmetic operation of removing the focused dot from the input-reflected low-pass halftone image at step S20, the following Expression 17 and Expression 18 are used instead of Expression 4:

$$F\_HT(x0+i,y0+j) \leftarrow F\_HT(x0+i,y0+j)-F_2(i,j) \quad \text{(Expression 17);}$$

$$RIN\_F\_HT(x,y)=F\_IN(x,y)/F\_HT(x,y) \quad \text{(Expression 18).}$$

By Expression 17, the low-pass halftone image is corrected, and by applying the low-pass halftone image F_HT (x, y) after the correction to the denominator of Expression 18, it is corrected to the low-pass halftone image in which the focused dot is removed.

Then, instead of determining a pixel having a minimum value of the input-reflected low-pass halftone image to be a dot placement pixel at step S22 of FIG. 4, a pixel having a maximum value in the input-reflected low-pass halftone image corrected by Expression 17 or Expression 18, or a pixel having a value larger by a prescribed value than a pixel value corresponding to the focused dot position or further larger value, is determined to be a dot placement pixel. The prescribed value may be a fixed value, or may be changed each time a dot is displaced. When changing the prescribed value, a negative value may be included.

In this way, the focused dot is placed on the determined dot placement pixel (step S24), and along with the placement of the focused dot, at step S26, the input-reflected low-pass halftone image is updated using the following Expression 19 and Expression 20 instead of Expression 6:

$$F\_HT(x1+i,y1+j) \leftarrow F\_HT(x1+i,y1+j)+F_2(i,j) \quad \text{(Expression 19);}$$

$$RIN\_F\_HT(x,y)=F\_IN(x,y)/F\_HT(x,y) \quad \text{(Expression 20).}$$

By Expression 19, correction of the low-pass halftone image, along with the placement of the focused dot, is performed, and by applying the low-pass halftone image F_HT(x, y) after the collection to the denominator of Expression 20, the input-reflected low-pass halftone image is updated.

Variation 5 of Embodiment

Regarding the definition of the input-reflected low-pass halftone image, while description has been given on the case of defining it by a "difference" calculated by a subtracting process (subtraction) as in Expression 1 and Expression 13, and the case of defining it by a "quotient" calculated by a dividing process (division) as in Expression 2 and Expression 16, it is also possible to handle a subtracting process as an adding process (addition) of a negative value, and handle division as a multiplying process (multiplication) of a fraction. As such, according to such equivalent handling, a difference calculated by subtraction can be expressed as a "sum" calculated by addition, and a quotient calculated by division can be expressed as a "product" calculated by multiplication.

<Regarding Program for Causing Computer to Function as Image Processing Device>

It is possible to store a program for allowing a computer to function as the image processing device described in the above-described embodiments on a computer readable medium (tangible non-transitory information storage medium) such as a CD-ROM (Compact Disc read-only memory) or a magnetic disk, and to provide the program through the information storage medium. Instead of such an aspect of storing a program on an information storage medium and providing it, it is also possible to provide a program signal by using a communication network such as the Internet as a download service.

Further, it is also possible to provide the image processing device 20 or 120 as an application server, and to provide a processing function through a communication network.

Further, by incorporating this program into a computer, it is possible to allow the computer to realize the respective functions of the image processing device 20 or 120, whereby the image processing function described in the above-described embodiment can be realized.

Further, an aspect of installing part or the whole of a program for realizing printing control including the image processing function described in the present embodiment, to a host control unit such as a host computer, and an application as an operation program of a central processing unit (CPU) on the printing device 24 side, are also possible.

Advantages of Embodiments (1) In the DBS method described in the comparative example, regarding each focused dot, it is required to temporarily displace the dot to each candidate pixel and repeat operation of calculating an error between the low-pass input image and the low-pass halftone image. As such, a large amount of arithmetic operation is required. Meanwhile, according to the present embodiment, such arithmetic operation is not required, whereby the amount of arithmetic operation can be reduced significantly.

(2) The image processing method described in the embodiments can be understood as a new halftone processing method realized by improving the conventional DBS method. Further, the image processing device 20 or 120 can be understood as a halftone processing device.

In the embodiments of the present invention described above, it is possible to change, add, or delete constituent elements appropriately within the scope not deviating from the effect of the present invention. The present invention is not limited to the embodiments described above. Various variations can be made by those having ordinary skill in this field of art within the technical concept of the present invention.

What is claimed is:

1. An image processing device comprising:
a low-pass input image generation unit which generates a low-pass input image obtained by applying a first low-pass filter to an input image;
a low-pass halftone image generation unit which generates a low-pass halftone image obtained by applying a second low-pass filter to a halftone image corresponding to the input image;
a dot displacing unit which performs the dot displacement processing to displace a dot in the halftone image to make a difference between the low-pass input image and the low-pass halftone image smaller, and updates a dot arrangement of the halftone image;
an input-reflected low-pass halftone image generation unit which generates an input-reflected low-pass halftone image representing a difference between the low-pass input image and the low-pass halftone image;
a focused dot setting unit which sets a focused dot in the halftone image; and
a dot placement pixel determination unit which determines a dot placement pixel by comparing pixel values to each other in the input-reflected low-pass halftone image, the dot placement pixel being a location where a dot is placed in the halftone image when dot displacement processing is performed to improve uniformity of gradation distribution in the input-reflected low-pass halftone image, thereby reducing error between the low-pass input image and the low-pass halftone image, wherein
the dot displacing unit performs the dot displacement processing to displace the focused dot in the halftone image to a position of the dot placement pixel in the halftone image, and updates a dot arrangement of the halftone image.

2. The image processing device according to claim 1, wherein the dot arrangement of the halftone image corresponding to the input image is optimized by changing the focused dot, and with respect to another focused dot, repeating processing of determining the dot placement pixel by the dot placement pixel determination unit and the dot displacement processing by the dot displacing unit.

3. The image processing device according to claim 1, wherein the input-reflected low-pass halftone image generation unit generates the input-reflected low-pass halftone image representing a difference between the low-pass input image and the low-pass halftone image by performing subtraction on pixel values of corresponding pixels between images of the low-pass input image and the low-pass halftone image.

4. The image processing device according to claim 1, wherein the input-reflected low-pass halftone image generation unit generates the input-reflected low-pass halftone image representing a ratio between the low-pass input image and the low-pass halftone image by performing division on pixel values of corresponding pixels between images of the low-pass input image and the low-pass halftone image.

5. The image processing device according to claim 1, further comprising
a input-reflected low-pass halftone image correction unit which performs correction processing on the input-reflected low-pass halftone image and updates the input-reflected low-pass halftone image, along with the dot displacement processing by the dot displacing unit,
wherein the input-reflected low-pass halftone image correction unit updates the input-reflected low-pass halftone image by removing, from the input-reflected low-pass halftone image, a contribution component of the second low-pass filter corresponding to the focused dot, and adding, to the input-reflected low-pass halftone image, a contribution component of the second low-pass filter corresponding to the focused dot placed on the dot placement pixel by the dot displacement processing.

6. The image processing device according to claim 1, further comprising:
a first density value conversion unit which converts a gradation value of each pixel in the input image into a density value; and
a second density value conversion unit which converts a gradation value of a dot of each pixel in the halftone image corresponding to the input image, into a density value,
wherein the low-pass input image generation unit generates the low-pass input image by applying the first low-pass filter to an image obtained by converting a gradation value in the input image into a density value by the first density value conversion unit, and
the low-pass halftone image generation unit generates the low-pass halftone image by applying the second low-pass filter to an image obtained by converting a gradation value in the halftone image into a density value by the second density value conversion unit.

7. The image processing device according to claim 1, further comprising
an initial halftone image generation unit which generates an initial halftone image corresponding to the input image.

8. The image processing device according to claim 7, wherein the initial halftone image generation unit generates a halftone image showing an arrangement pattern of dots of a number of dots defined based on the input image.

9. The image processing device according to claim 1, wherein the halftone image includes a plurality of dot types in a mixed manner, and
the second low-pass filter corresponding to each of the dot types differs for each of the dot types.

10. The image processing device according to claim 1, wherein the dot placement pixel determination unit determines, among blank pixels as candidates existing within a range of an image area predetermined from a pixel position of the focused dot, a pixel having a minimum value in the input-reflected low-pass halftone image to be the dot placement pixel.

11. The image processing device according to claim 1, wherein the dot placement pixel determination unit determines, among blank pixels as candidates existing within a range of an image area predetermined from a pixel position of the focused dot, a pixel selected from pixels having a value smaller by a prescribed value than a pixel value corresponding to a pixel position of the focused dot in the input-reflected low-pass halftone image or a further smaller value to be the dot placement pixel.

12. A printing system comprising:
the image processing device according to claim 1; and
a printing device which performs printing on a print medium based on a halftone image generated by repeating the dot displacement processing by the dot displacing unit.

13. An image processing method comprising:
a low-pass input image generation step of generating a low-pass input image obtained by applying a first low-pass filter to an input image;
a low-pass halftone image generation step of generating a low-pass halftone image obtained by applying a second low-pass filter to a halftone image corresponding to the input image;
an input-reflected low-pass halftone image generation step of generating an input-reflected low-pass halftone image representing a difference between the low-pass input image and the low-pass halftone image;
a focused dot setting step of setting a focused dot in the halftone image;
a dot placement pixel determination step of determining a dot placement pixel by comparing pixel values to each other in the input-reflected low-pass halftone image, the dot placement pixel being a location where a dot is placed in the halftone image when dot displacement processing is performed to improve uniformity of gradation distribution in the input-reflected low-pass halftone image, thereby reducing error between the low-pass input image and the low-pass halftone image; and
a dot displacement step of performing the dot displacement processing to displace the focused dot in the halftone image to a position of the dot placement pixel in the halftone image to make a difference between the low-pass input image and the low-pass halftone image smaller, and updating a dot arrangement of the halftone image.

14. The image processing method according to claim 13, further comprising:
a first density value conversion step of converting a gradation value of each pixel in the input image into a density value; and
a second density value conversion step of converting a gradation value of a dot of each pixel in the halftone image corresponding to the input image, into a density value,
wherein in the low-pass input image generation step, the low-pass input image is generated by applying the first low-pass filter to an image obtained by converting a gradation value in the input image into a density value in the first density value conversion step, and
in the low-pass halftone image generation step, the low-pass halftone image is generated by applying the second low-pass filter to an image obtained by converting a gradation value in the halftone image into a density value in the second density value conversion step.

15. A non-transitory computer-readable recording medium including instructions stored thereon, such that when the instructions are read and executed by a computer, the computer is configured to realize:
- a low-pass input image generation function which generates a low-pass input image obtained by applying a first low-pass filter to an input image;
- a low-pass halftone image generation function which generates a low-pass halftone image obtained by applying a second low-pass filter to a halftone image corresponding to the input image;
- an input-reflected low-pass halftone image generation function which generates an input-reflected low-pass halftone image representing a difference between the low-pass input image and the low-pass halftone image;
- a focused dot setting function which sets a focused dot in the halftone image;
- a dot placement pixel determination function which determines a dot placement pixel by comparing pixel values to each other in the input-reflected low-pass halftone image, the dot placement pixel being a location where a dot is placed in the halftone image when dot displacement processing is performed to improve uniformity of gradation distribution in the input-reflected low-pass halftone image, thereby reducing error between the low-pass input image and the low-pass halftone image; and
- a dot displacing function which performs the dot displacement processing to displace the focused dot in the halftone image to a position of the dot placement pixel in the halftone image to make a difference between the low-pass input image and the low-pass halftone image smaller, and updates a dot arrangement of the halftone image.

16. The recording medium according to claim 15, wherein when the instructions are read and executed by the computer, the computer is configured to realize:
- a first density value conversion function which converts a gradation value of each pixel in the input image into a density value; and
- a second density value conversion function which converts a gradation value of a dot of each pixel in the halftone image corresponding to the input image, into a density value,
- wherein the low-pass input image generation function generates the low-pass input image by applying the first low-pass filter to an image obtained by converting a gradation value in the input image into a density value by the first density value conversion function, and
- the low-pass halftone image generation function generates the low-pass halftone image by applying the second low-pass filter to an image obtained by converting a gradation value in the halftone image into a density value by the second density value conversion function.

* * * * *